US008244841B2

(12) United States Patent
Shaji et al.

(10) Patent No.: US 8,244,841 B2
(45) Date of Patent: Aug. 14, 2012

(54) METHOD AND SYSTEM FOR IMPLEMENTING GROUP POLICY OPERATIONS

(75) Inventors: Ullattil Shaji, Sammamish, WA (US);
Rahul Gupta, Bellevue, WA (US);
William J. Whalen, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1947 days.

(21) Appl. No.: 10/410,865

(22) Filed: Apr. 9, 2003

(65) Prior Publication Data
US 2004/0204949 A1 Oct. 14, 2004

(51) Int. Cl.
*G06F 7/00* (2006.01)
*G06F 17/00* (2006.01)
*G06F 15/173* (2006.01)

(52) U.S. Cl. .................. 709/223; 707/666; 707/694
(58) Field of Classification Search .................. 709/223; 707/100, 827, 640, 674, 694, 829, 666
See application file for complete search history.

(56) References Cited

U.S. PATENT DOCUMENTS

| 5,664,133 | A | 9/1997 | Malamud et al. |
|---|---|---|---|
| 6,088,451 | A | 7/2000 | He et al. |
| 6,160,550 | A | 12/2000 | Nakajima et al. |
| 6,199,082 | B1 * | 3/2001 | Ferrel et al. .................. 715/205 |
| 6,236,996 | B1 | 5/2001 | Bapat et al. |
| 6,243,700 | B1 | 6/2001 | Zellweger |
| 6,247,020 | B1 | 6/2001 | Minard |
| 6,253,234 | B1 | 6/2001 | Hunt et al. |
| 6,389,589 | B1 | 5/2002 | Mishra et al. |
| 6,412,070 | B1 | 6/2002 | Van Dyke et al. |
| 6,466,932 | B1 * | 10/2002 | Dennis et al. .................. 710/33 |
| 6,484,261 | B1 | 11/2002 | Wiegel |
| 6,519,647 | B1 | 2/2003 | Howard et al. |
| 6,567,808 | B1 | 5/2003 | Eschelbeck et al. |
| 6,578,192 | B1 | 6/2003 | Boehme et al. |
| 6,598,093 | B1 | 7/2003 | Schmidt et al. |
| 6,633,312 | B1 | 10/2003 | Rochford et al. |
| 6,651,096 | B1 | 11/2003 | Gai et al. |
| 6,718,386 | B1 | 4/2004 | Hanfland |
| 6,931,447 | B1 | 8/2005 | Hemstreet et al. |
| 6,947,991 | B1 | 9/2005 | Burton et al. |
| 6,950,818 | B2 * | 9/2005 | Dennis et al. .................. 1/1 |

(Continued)

OTHER PUBLICATIONS

Boswell, William, "Inside Windows 2000 Server". Publisher: Sams, Publication date: Dec. 22, 1999. pp. 1512. [retreived online from Safari Books Online on Dec. 15, 2008].*

(Continued)

*Primary Examiner* — Philip Chea
*Assistant Examiner* — Lashanya Nash
(74) *Attorney, Agent, or Firm* — Lee & Hayes, PLLC

(57) ABSTRACT

A system and method for performing various operations on group policy objects, by manipulating group policy objects as a single entity to perform backup, restore, import and copy operations. The backup operation transfers the various subparts of a selected group policy object to a file system. A restore operation restores a backed-up group policy object to its domain, in the same state as when the backup was performed. An import operation transfers the settings within a backed-up source group policy object to a destination group policy object, erasing its previous settings. A copy operation transfers the settings from a source group policy object to a new group policy object. Copy and import operations can be cross-domain, and a migration table can be used to convert security group and UNC pathnames as appropriate for the destination domain. Backup management, rollback of incomplete operations, and support for application deployment are also provided.

33 Claims, 10 Drawing Sheets

U.S. PATENT DOCUMENTS

| | | | |
|---|---|---|---|
| 7,437,441 B1 * | 10/2008 | Drew et al. | 709/223 |
| 2002/0032706 A1 | 3/2002 | Perla et al. | |
| 2002/0035584 A1 | 3/2002 | Scheier et al. | |
| 2002/0087670 A1 | 7/2002 | Epstein et al. | |
| 2002/0095524 A1 | 7/2002 | Sanghvi et al. | |
| 2002/0133579 A1 | 9/2002 | Bernhardt et al. | |
| 2002/0178249 A1 | 11/2002 | Prabakaran et al. | |
| 2002/0184269 A1 | 12/2002 | Imagou | |
| 2002/0188603 A1 | 12/2002 | Baird et al. | |
| 2003/0041139 A1 | 2/2003 | Beadles et al. | |
| 2003/0041142 A1 | 2/2003 | Zhang et al. | |
| 2003/0076358 A1 | 4/2003 | Nakajima et al. | |
| 2003/0126232 A1 | 7/2003 | Mogul et al. | |
| 2003/0135665 A1 | 7/2003 | Barker et al. | |
| 2003/0154404 A1 | 8/2003 | Beadles et al. | |
| 2003/0182287 A1 | 9/2003 | Parlanti | |
| 2004/0003279 A1 | 1/2004 | Beilinson et al. | |
| 2004/0075680 A1 | 4/2004 | Grace et al. | |
| 2004/0083453 A1 | 4/2004 | Knight et al. | |
| 2004/0098263 A1 | 5/2004 | Hwang et al. | |
| 2004/0107274 A1 | 6/2004 | Mastrianni et al. | |
| 2004/0110118 A1 | 6/2004 | Clark et al. | |
| 2004/0111393 A1 | 6/2004 | Moore et al. | |
| 2004/0153511 A1 | 8/2004 | Maynard et al. | |
| 2004/0204949 A1 | 10/2004 | Shaji et al. | |
| 2004/0215627 A1 | 10/2004 | Whalen et al. | |
| 2004/0215649 A1 | 10/2004 | Whalen et al. | |
| 2004/0215797 A1 | 10/2004 | Hadley | |
| 2005/0005233 A1 | 1/2005 | Kays et al. | |
| 2005/0108627 A1 | 5/2005 | Mireku | |
| 2005/0138137 A1 * | 6/2005 | Encarnacion et al. | 709/217 |
| 2005/0204309 A1 | 9/2005 | Szeto | |
| 2006/0122937 A1 | 6/2006 | Gatto et al. | |
| 2006/0288111 A1 | 12/2006 | Katinsky et al. | |
| 2007/0250840 A1 | 10/2007 | Coker et al. | |
| 2008/0109472 A1 | 5/2008 | Underwood et al. | |

OTHER PUBLICATIONS

Michael M. Swift, Anne Hopkins, Peter Brundrett, Cliff Van Dyke, Praerit Garg, Shannon Chan, Mario Goertzel, Gregory Jensenworth, "Improving the granularity of access control for Windows 2000", ACM Transactions on Information and System Security (TISSEC), v.5 n.4, p. 398-437, Nov. 2002 [retrieved from ACM database on Jun. 15, 2010].*

"ACM Database Search", The ACM Digital Library, Retrieved at ile:IIC:\DOCUME-\dmyint\LOCALS-\Temp\LOC9QFTR.htm Apr. 18, 2008, p. 1.

"Administering Group Policy with the GPMC", www.microsoft.com, Retrieved at http://www.microsoft.com/windowsserver2003/gpmc/gpmcwp.mspx, 74 pages.

Boswell, "INSIDE Windows 2000 Server", New Riders Publishing, 1999, Excerpts from p. 173 to p. 1141 (Reference to 173, 261, 297, 339, 496, 497, 1122-1127, 1132, 1133, 1140, 1141), 19 pages.

Boswell, "INSIDE Windows 2000 Server", New Riders Publishing, 1999, Excerpts from p. 343 to p. 925 (Reference to 343, 357, 359, 386, 387, 479, 917-925), 19 pages.

Boswell, "INSIDE Windows 2000 Server", New Riders Publishing, 1999, Excerpts from p. 505 to p. 1148 (Pages are not in numerical order; The following pages are reference: 505, 649, 1114, 1122-1125, 1141, 1142, 1146, 1147, 387, 1134, 1135, 1138, 1139), 19 pages.

Christopher-Knight, "Managing Security with Group Policy and the Windows Server 2003 Group Policy Management Console", retrived on Sep. 3, 2010 at http://www.sans.org/readingroom/whitepapers/windows/policy-windows-server-2003-group-policy-management-console1374, Feb. 2003, pp. 1-65.

Fullerton, et al., "Special Edition Using Microsoft Active Directory", Published in 2001, 11 pages.

"Google Scholar Database Search", Google Scholar, Retrieved at http://scholar.google.com/scholar?q=interface +entry+point+ &hl=en&lr=&btnG=Search, Apr. 18, 2008, p. 1.

"IEEE Database Search", IEEE Xplore, Retrieved at IIC:\DOCUME-\dymint\LOCALS-\Temp\7IU92FK1.htm, Apr. 18, 2008, p. 1.

Office Action for U.S Appl. No. 12/850,853, mailed on Nov. 21, 2011, William J. Whalen, "Support Mechanisms for Improved Group Policy Management User Interface", 24 pgs.

Office Action for U.S Appl. No. 12/850,853, mailed on Jul. 20, 2011, Alicia M. Lewis, "Support Mechanisms for Improved Group Policy Management User Interface".

* cited by examiner

METHOD AND SYSTEM FOR IMPLEMENTING GROUP POLICY OPERATIONS

CROSS-REFERENCE TO RELATED APPLICATIONS

The present invention is related to the following copending U.S. patent applications, entitled "Support Mechanisms for Improved Group Policy Management User Interface" Ser. No. 10/410,887, "Method and System for Representing Group Policy Object Topology and Relationships" Ser. No. 10/410,883, and "Interfaces and Methods for Group Policy Management" Ser. No. 10/411,876, filed concurrently herewith. Each related application is assigned to the assignee of the present patent application and hereby incorporated by reference herein in its entirety.

FIELD OF THE INVENTION

The invention relates generally to computer systems and networks, and more particularly to policies used in computer networks.

BACKGROUND OF THE INVENTION

In contemporary computing networks, network administrators define policies for users and computer systems of that network. With a Microsoft Windows®-based operating system, administrators use Group Policy technology to define the state of users' work environment, and rely on the system to enforce the defined policies. In general, those policies are then applied to determine how the various computer systems are configured. For example, the configuration that a user sees when logged onto any computer system of the network depends on the policy settings for that machine combination with the policy settings for that user.

In such a network, Group Policy can be used to specify many of the settings for a user and computer, including registry-based policy settings used to configure and specify behavior of the operating system and optionally application programs based on settings in various computer systems' registries, and script-related policy settings control scripts for computer startup and shutdown, and user logon and logoff. Group policy can also specify particular software programs for groups of users and/or machines, as Group Policy includes settings for centrally managing the installation, updates, and removal of application programs and components. Security options are also provided by policy settings, e.g., for local computer, domain, and network security settings. Folder redirection options, which allow administrators to redirect users' special folders to the network, also may be managed via Group Policy, as can Internet Explorer Maintenance, which is used to manage settings related to Internet Explorer and Remote Installation Services options, which are used to manage client configuration options that users see when performing Remote Installation Services-based installs. Internet Protocol Security Settings and Wireless settings can also be deployed through Group Policy, and public key policy settings, as well as software restriction policies can also be managed.

To apply and enforce the policy in a Windows®-based operating system, the Group Policy settings that administrators create are contained in group policy objects (GPOs), which in turn are applied to one or more scopes of management, such as a site, domain, or organizational unit (OU) in Active Directory®. A site, domain, or organizational unit may also be referred to as a scope of management, or SOM. In this manner, administrators centrally apply policy to users and computers of those sites, domains, and organizational units. Policy settings from each of these different hierarchical levels are combined and applied to the policy recipients. Any conflicting policy among the levels is resolved via various rules, as generally described in U.S. Pat. No. 6,466,932, herein incorporated by reference.

While Group Policy thus greatly simplifies network administration, group policy objects are not simple objects, but rather virtual objects comprising complex pieces of setting definitions that are stored on the domain, e.g., in an Active Directory® service objects and attributes and in file system (sysvol) files. In general, each group policy object comprises multiple subcomponents, typically including a collection of many files, other objects and attributes, that reference one another in various ways. Although the creation of a group policy object is facilitated by software tools, because of the many complex settings and interrelationships, each group policy object still may take many hours to configure and test, before that group policy object can be deployed on a production domain.

However, deployment itself is not straightforward, as due to a number of factors, there have heretofore been only very limited ways to implement operations on a group policy object, once created. For example, some of the settings in a group policy object may be specific to the domain in which that group policy object resides. For such domain-specific group policy objects, is thus virtually impossible to use them on a different domain and obtain the same effect, since many of the settings would be irrelevant, while others might cause substantial errors, including potential security problems. At the same time, deploying a group policy object on a domain without testing it is dangerous, and thus administrators need to create a group policy object, test it on a test domain making adjustments as necessary, and then re-create the group policy objects with appropriate modifications for a production domain. This is time-consuming and error prone; what is needed is a better way to operate on group policy objects.

SUMMARY OF THE INVENTION

Briefly, the present invention provides a system and method for performing various operations on group policy objects (e.g., of a directory service), including backup, restore, import and copy operations, via functions that implement those operations. In one implementation, a group policy management console provides mechanisms that are accessible via interfaces to manipulate group policy objects as a single entity. Calling these interfaces accesses the various corresponding operations' functionality, including backing up and restoring a group policy object, and copying and importing a group policy object into another location. Cancel support that allows an in-progress operation to be cancelled is also provided.

Each group policy object comprises a number of subparts, including a globally unique identifier (GUID), the settings of the group policy object, discretionary access control lists (DACLS), and possibly a link to a management instrumentation filter (such as a Windows Management Instrumentation filter, or WMI filter), but not the management instrumentation filter itself.

Each of the group policy object operations acts on at least some these subparts in various ways. The backup operation transfers the various subparts of a selected group policy object to a file system. A backed-up group policy object can later be returned to the directory service, either via a restore operation (limited to its original domain when created) or an import operation (into another group policy object in any domain). Note that the backup function also serves as an export function.

The restore operation restores the contents of a backed-up group policy object to a live group policy object, restoring that live group policy object to the same state as it was in when the backup was performed. The restore operation is only valid in the domain where the group policy object was originally created. The restore returns the state whether the original group policy object still exists or was deleted since the backup. A restore operation restores the same group policy object GUID, the same settings and the same discretionary access control lists (DACLs) to the group policy object. A restore operation does not modify links to the group policy object, however, as those are attributes of the scope of management (SOM, e.g. site, domain, or organizational unit) to which the group policy object is linked, and not group policy object-specific data.

The import operation transfers the settings within one backed-up (source) group policy object to another (destination) group policy object that is importing those settings, but does not transfer other data such as the GUID, DACLs or WMI filter link. The source group policy object comprises any group policy object that is backed-up in the file system, while the destination group policy object comprises an existing group policy object in the directory service that has been specifically targeted by the administrator for import. An import erases any settings that previously existed within the destination group policy object and replaces them with the settings of the source group policy object. Because only the settings are transferred during the import, the existing GUID and the DACLs on the destination group policy object are not modified, nor are any links that point to this group policy object, nor any link to the WMI filter (that is, if one exists). The import operation can import settings into another group policy object in the same domain, or can operate across domains and across forests, (where a forest is a grouping of domains). Import allows settings to be copied even if there is no trust relationship between the source and the destination domain.

The copy operation, like an import operation, transfers only the settings from a source group policy object, by copying the settings from a source group policy object into a new group policy object. Unlike an import, however, the file system is not involved, as the source group policy object is a live group policy object in the directory, rather than being a backed-up group policy object in the file system. The destination is a newly created group policy object (with a new GUID) that is created as part of the copy operation. The administrator performing the copy may give the new group policy object the default DACLs for group policy objects, or preserve the DACLs of the source group policy object. A copy operation does not transfer links to the new group policy object, and (like the import operation) can be used with group policy objects in the same domain, across domains, and across forests. Note that within the same domain, a WMI filter link is transferred to a target group policy object, but is dropped in a cross-domain copy case (e.g., because it is domain-specific and cannot be linked to group policy objects in external domains). Further note that, since the source and destination domains are simultaneously accessed, a proper trust relationship needs to exist between the domains, or if there is no trust between source and destination domains, a feature such as "Stored User Names and passwords" in Windows® may be used to gain simultaneous access to both domains so that the copy operation can be performed.

Each of the group policy object operations is driven by a layout (configuration) file that defines the data relevant to each group policy extension, wherein extensions arrange policy by type; examples include extensions directed to administrative template settings, security settings, software installation, folder redirection, Internet Explorer maintenance, scripts and remote installation services. The group policy object layout file (e.g., an extensible markup language-formatted, or XML file) is loaded in memory to get a list of the extensions for which the layout is known. The source group policy object is scanned for the specified extensions, and the in-memory structure pruned to remove any extensions that were not specified in the group policy object. The directory service data is read, and file system configurations are setup. The layout file also allows specification of custom code, to allow for pre-processing and post-processing, and indicates whether additional data need to be extracted from the extension data to get a description of the data that can be specified in a migration table (described below) that facilitates the operation across domains, and/or whether to migrate the old entries to new entries based on the migration table when setting the data in a group policy object.

In addition to the main operations, there is provided backup management, that stores the backed up group policy objects in a manner that facilitates their access and their ability to be found. To this end, each backup (containing many folders and files) is contained in its own GUID-identified folder, and those GUID-identified backups collected under an administrator-specified backup folder. Rather than enumerate and search the backup folder, a manifest file is provided that tracks the key information about the backups in the backup folder, thereby facilitating enumeration and finding of the GUID-identified backups therein. Because the actual backup folder contents are folders and files that can be changed like any other files and folders, when accessed, the manifest file is first checked against the actual folder contents to ensure it is still valid before it is used. If not valid the manifest is automatically regenerated based on the actual folder contents whereby it is no longer invalid.

Support for application deployment (software installation) is also provided, including preserving upgrade relationships between software programs that are specified in the group policy objects. The support is provided on restore operations by attempting to reuse the GUIDs of package objects identified in the group policy object whenever possible. For example, in the event that a restore is performed but an application package object has been deleted, the GUID for the package heretofore could not be restored because the directory service assigns a new GUID to the newly created package object. This causes application re-installs, problems with upgrade relationships, and so on. However, in certain environments this reuse of the GUID is still sometimes possible, because in such environments, deleted objects can be reanimated. To this end, because objects are not immediately deleted, but instead are represented by a tombstone which indicates that the object will be deleted in the future, certain environments provide tombstone reanimation, whereby the deleted object can be reanimated and its GUID reused.

For copies and imports across domains, migration tables may be specified for use. Migration tables are files (e.g., XML files) that are used by the copy and import mechanisms to modify source-specific settings into appropriately corresponding destination-specific settings. For example, security group-related data specific to the source domain can be migrated to a corresponding security group-related data on the destination domain. UNC pathnames can also be converted by the migration table during the copy or import operation.

Other advantages will become apparent from the following detailed description when taken in conjunction with the drawings, in which:

DETAILED DESCRIPTION

Exemplary Operating Environment

Figure 1:
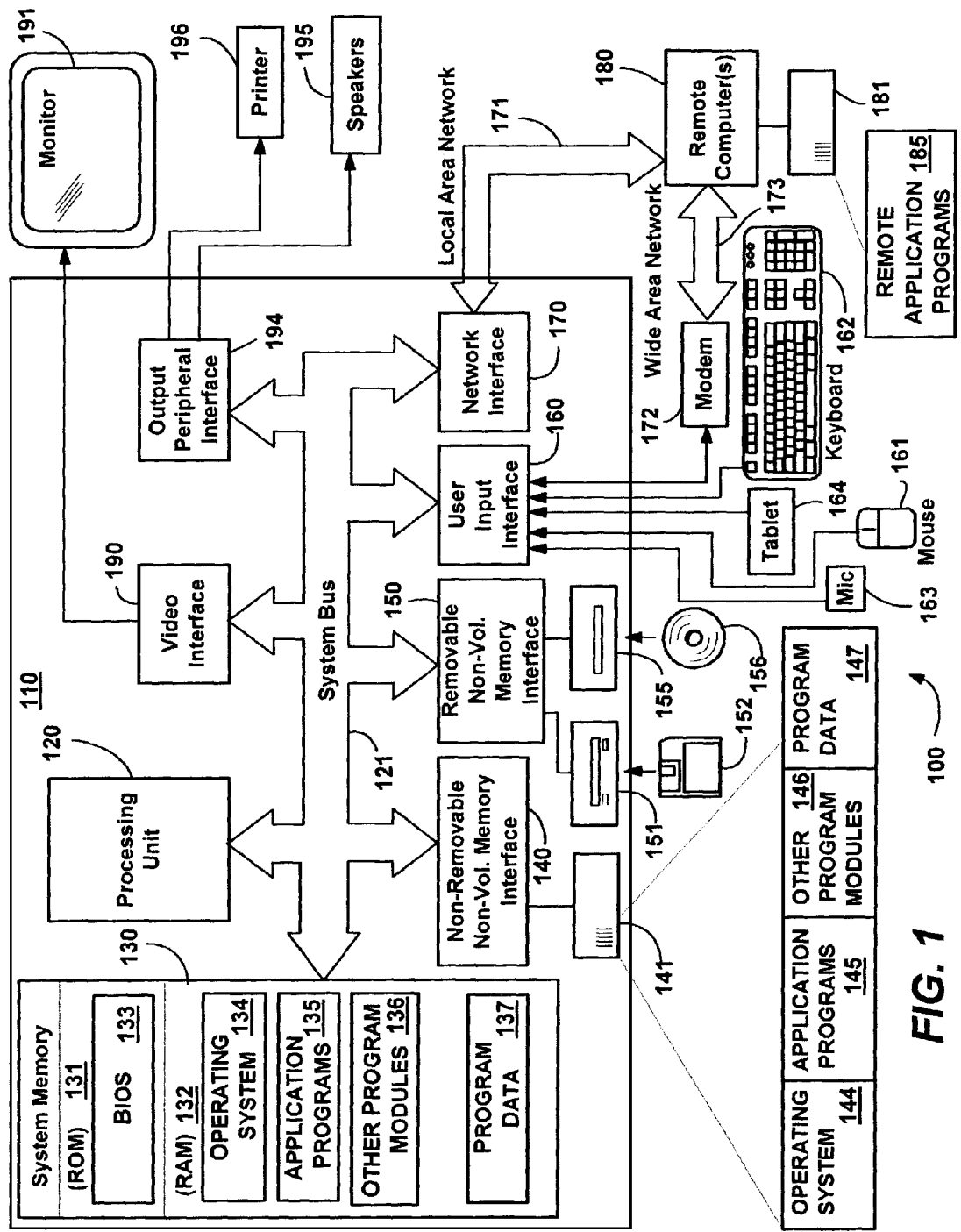
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in the present invention, the computer system 110 may comprise source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Group Policy Objects

In general, the present invention provides a method and system for operating on policies implemented throughout a network, wherein those policies are defined and arranged (e.g., by one or more administrators) into group policy objects. Group policy objects generally comprise a collection of files, objects and attributes that exist at various locations in the network. Such policy may correspond to policy settings in the group policy objects, including registry-based settings, scripts, (computer startup and shutdown scripts, and user logon and logoff scripts), redirection of folders that contain user documents and settings, application deployment (software installation), security settings, public key policy settings, software restriction policies, IP security, remote installation services, and/or Internet Explorer Maintenance. Indeed, group policy objects may be extended to include virtually any desired information, as long as a client-side (or other) extension that uses the policy object is capable of interpreting and/or handling the information therein.

In an example implementation described herein, the system and method of operating on group policy utilize a highly flexible architecture of the Microsoft Windows® operating system, in which an administrator links the group policy objects to the containers, which comprise hierarchically organized directory objects representing sites, domains and organizational units, with policy recipients (e.g., users and computers) being associated with those containers. In this implementation, generally represented in FIG. 2, the group policy objects preferably utilize a Windows® directory service (e.g., in components 201 and 202), known as Active Directory, which stores information about the objects of a domain, and makes this information easy for administrators to access, find and apply via a single, consistent and open set of interfaces. Note that each domain controller has a directory service component, with data replicated to other directory service components, but for purposes of the examples the directory service will be described with reference to the directory service component 202. Thus, for example, with the Active Directory® service 202, administrators can access resources anywhere on the network. Similarly, administrators have a single point of administration for the objects on the network, which can be viewed in a hierarchical structure. Each domain controller also has a sysvol component that is similarly replicated, typically for maintaining larger sets of data (relative to the size of the sets of data in the directory service). Note that for purposes of explanation herein, the user performing such group policy object-related tasks will be referred to as an administrator, although it is understood that any user with appropriate security privileges can perform these tasks, even if not actually designated as an administrator.

Figure 2:
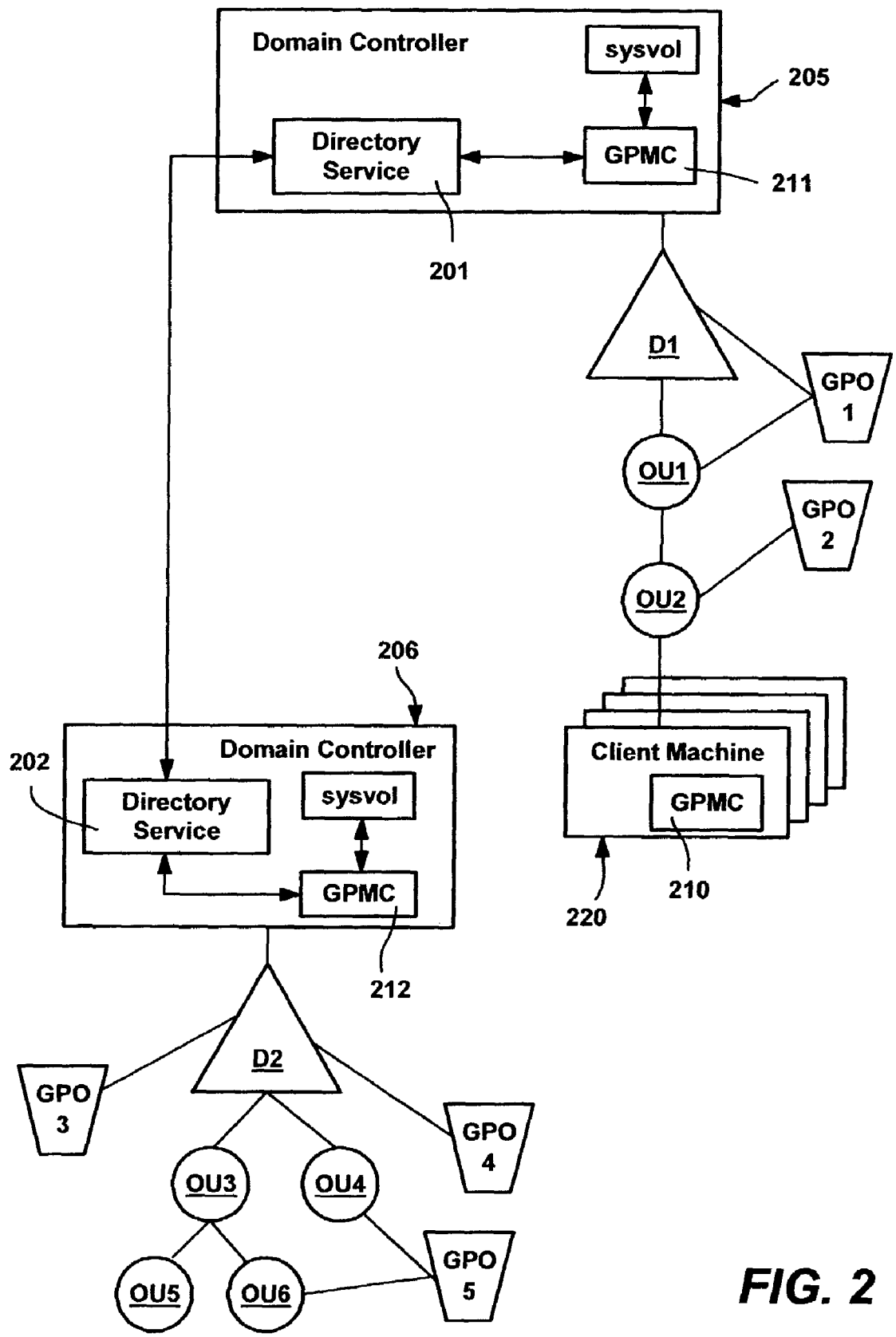
FIG. 2 is a block diagram generally representing a network including a directory service and domain controllers with group policy objects capable of being operated on in accordance with an aspect of the present invention.
Figure 3:
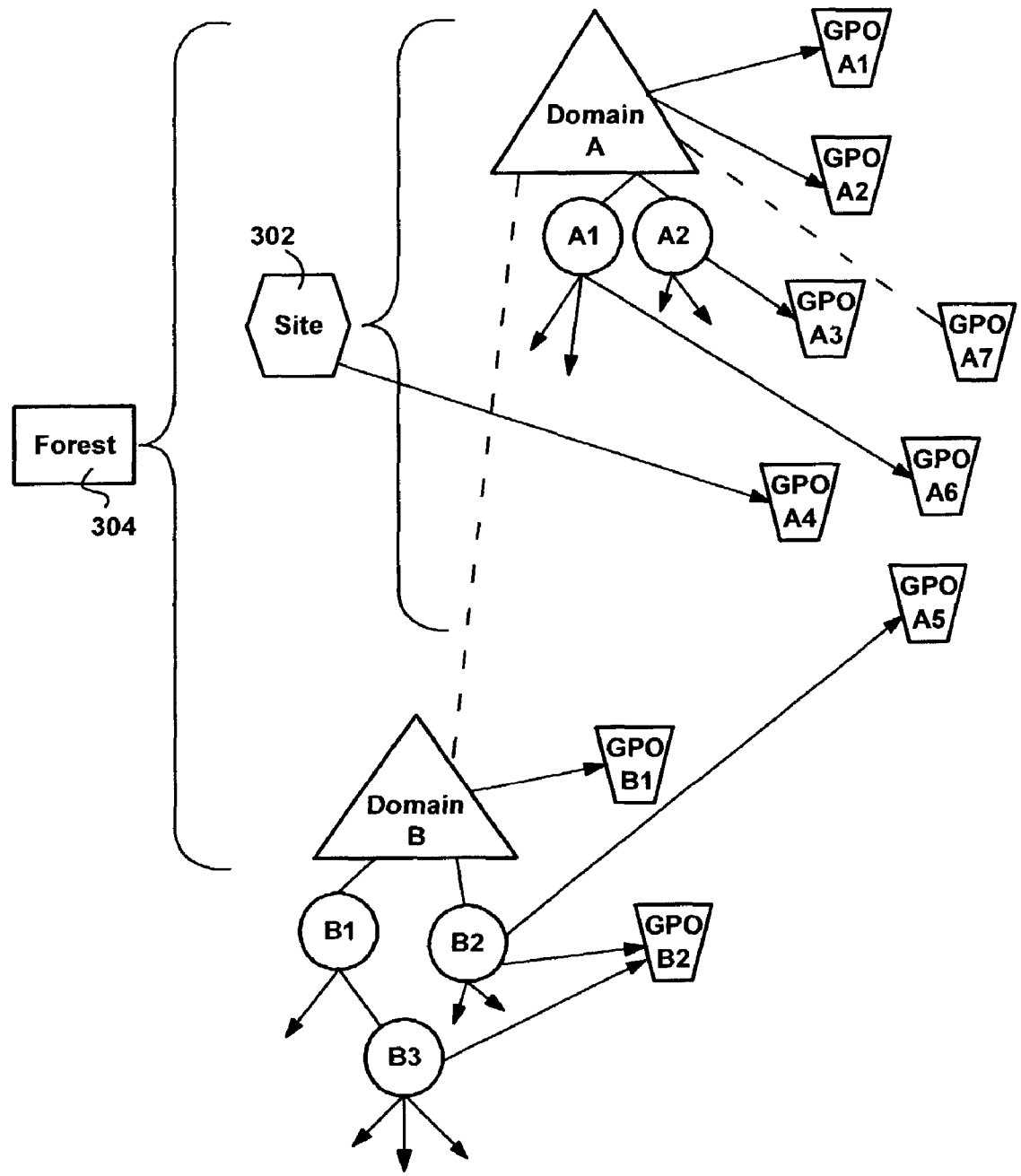
FIG. 3 is a representation of a forest, site, domains and organizational units in network with associated group policy objects capable of being operated on in accordance with an aspect of the present invention.

A core unit in the Active Directory® service is a domain, shown via domains D1 and D2 in FIG. 2, which are each controlled by one or more domain controllers, shown as the domain controller 205 and the domain controller 206, respectively. Note that there may be more than one domain controller per domain. Many of the objects of a network exist within a domain. As generally represented in FIG. 3, a single domain can span multiple physical locations or sites (e.g., 302), and domains can be grouped together into a forest 304, typically in some logical grouping as determined by an administrator. A site 302 comprises one or more ranges of IP addresses of which computers can be a member, often a grouping of computers related by some geographical area.

Organizational units (e.g., OU1-OU6 in FIG. 2) are a type of directory object included within domains that are hierarchically organized logical containers into which users, groups, computers, and even other organizational units may be logically placed. Group policy objects e.g., GP1-GP5 in FIG. 2) are stored in (exist in) a domain, and can be applied to one or more sites, domains, and/or organizational units. Note that a site, domain, and/or organizational unit may be referred to as a scope of management, or SOM. It will be readily appreciated that although described herein with reference to Microsoft Windows®, the Active Directory® service, sites, domains, organizational units, and so forth, the present invention is not limited thereto, nor even to directory containers in general, but rather is applicable to any types of policy objects and/or scoping mechanisms that require management in a network.

To apply policy to policy recipients (users and machines) of the network, group policy objects may be created via a group policy management console (e.g., 210, 211 or 212 in FIG. 2), or similar program with a suitable user and/or programmatic interface. Note that as represented in FIG. 2, an instance of the group policy management console may be run from essentially any machine in the network that is capable of running a management program, including client machines (e.g., 220) or the domain controllers 205 and 206. Once created, group policy objects may then be linked to an appropriate container or containers (e.g., objects representing a scope of management, such as sites, domains and organizational units) that are arranged in a hierarchy with which the policy recipients are associated. For example, any group policy management console 210, 211, 212 or similar user interface tool allows administrators to selectively associate the group policy objects GPO1 and GPO2 with directory container objects D1, OU1 and OU2 in FIG. 2. Note that as represented by the dashed line from Domain A to the group policy object GPOA7 in FIG. 3, a group policy object may exist in a domain but not be linked to a container.

Each group policy object (e.g., GPO3 of FIG. 2) may be composed of group policy information maintained in many locations in the network, including objects and attributes stored in the Active Directory® service 202, and collections of system volume (sysvol) files, wherein the sysvol comprises a folder on a domain controller (e.g., 206), such as used to replicate file-based data among domain controllers. The policy information may include one or more pointers to another location (e.g., a data file on a remote share) where some or all of the actual policy information (or a further pointer thereto) is maintained. Policy information also may be stored in a virtual registry (e.g., a copy of some or all of a client machine's registry maintained in a file on the server, specifically in the group policy template), that may be used by an extension to put information into the client-machine's registry.

Because many group policy objects can apply to one policy recipient, such as via a domain association or one or more organizational units to which the policy recipient belongs, for each policy recipient, the policy settings maintained in the policy objects may be selectively accumulated in an order of precedence, inherited from the group policy objects associated with one or more higher-up organizational units, a site, and/or the domain, and/or blocked from being inherited. In general, to accumulate policy for a policy recipient, policies are applied in a manner such higher policies that are enforced take precedence by hierarchical order, while higher non-enforced policies may be overridden by lower-level policies.

Operations on Group Policy Objects

Figure 4:
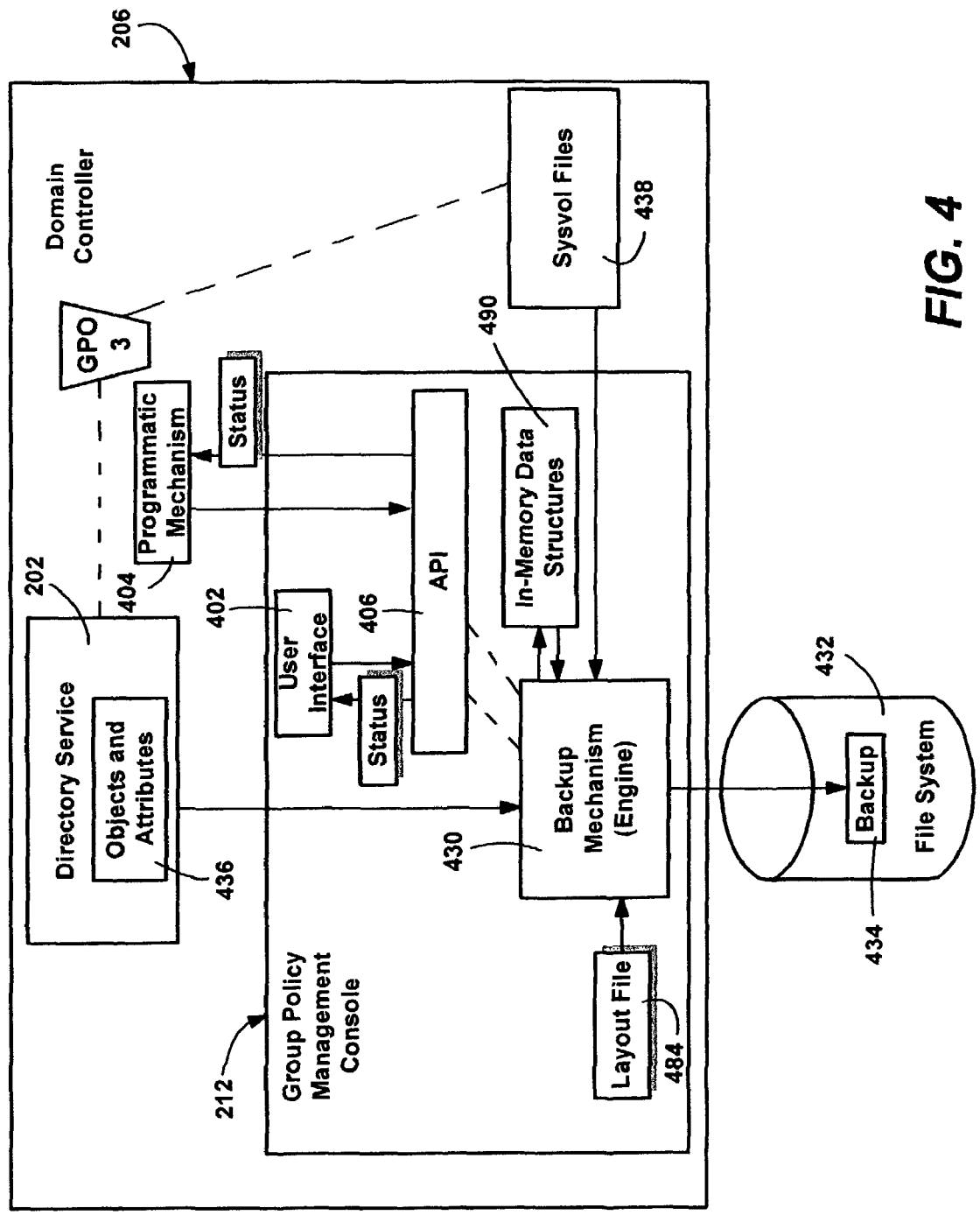
FIG. 4 is a block diagram generally representing a backup mechanism for backing up a group policy object to persistent storage in accordance with an aspect of the present invention.

The present invention is generally directed towards performing various operations on group policy objects, including backing up group policy objects, restoring them, and importing and copying settings to them, via functions that implement those operations. To this end, the group policy management console (e.g., 212) provides mechanisms that are accessible via interfaces to manipulate group policy objects as a single entity. As described below, calling these interfaces provides access to the various corresponding operations' functionality, including backing up and restoring a group policy object, and copying and importing a group policy object into another location, in accordance with various aspects of the present invention. As represented in FIG. 4 (with respect to a backup example), these functionalities are accessed through a user interface 402 of the group policy management console (e.g., 212) that calls interfaces to the group policy management console 212, as well as via programmatic (e.g., scripting, and/or programming languages such as C# or C++) mechanisms 404 that can call these interfaces. An API layer or the like 406 (e.g., via object interfaces to methods) is provided to facilitate the communication. Note that the various operations described below may be considered part of the APIs, as in one implementation the functionality of the operations is incorporated into methods in the APIs, however alternative implementations may have some or all of the functionality of the operations performed by components that are external to the APIs and invoked thereby.

For the purposes of group policy object operations, each group policy object is considered as having a number of primary subparts (attributes), including a globally unique identifier (GUID), the settings of the group policy object (including disabled/enabled state of user/computer configuration), and discretionary access control lists (DACLS). A link to a management instrumentation filter, e.g., a WBEM-based filter such as a WMI (Windows Management Instrumentation) filter may be included, (but not the filter itself, which is a separate entity). Note that for purposes of simplicity herein, such a management instrumentation filter, and the link thereto, may be generally referred to as a WMI filter and WMI filter link, respectively, however it is understood that WMI filters and links are only examples, and that other management instrumentation filters and links are equivalent. Further, note that for purposes of explanation, as used herein, the term "settings" of a group policy object should be distinguished from GUIDs, DACLs, links and so forth, even though GUIDs, DACLs, links and the like may be considered part of a group policy object's overall settings in other, more general contexts. It is also feasible to handle scope of management (SOM) links, (wherein a SOM generally refers to a site, domain, or organizational unit). Each of the group policy object operations acts on at least some these attributes in various ways, as described below.

In accordance with an aspect of the present invention, there is provided a user interface and components (e.g., COM objects) that programmatically provide the functions for implementing the operations on group policy objects, such as GPO3 in FIG. 4. Note that the group policy management console may be run from a client computer in virtually any domain, even though the group policy management console can perform operations across domains and across forests of domains, (provided the administrator has the appropriate access rights). However, for purposes of the present example, the illustrated group policy management console 212 is run on the domain controller 206.

As represented in FIG. 4, one of the group policy object operations comprises the backup operation, which is provided by a backup mechanism (function) 430 that transfers various aspects of a selected group policy object (e.g., GPO3 of a domain D2 on which the group policy object lives) of the directory service 202 to a file system 432, represented by some persistent storage. Such aspects include objects and attributes 436 of the directory service 202, and sysvol files 438 of the domain controller 212 (as generally represented by the dashed lines to the group policy object GPO3). The file system 432 may be at virtually any location on the network to which the administrator has appropriate access rights, e.g., read/write privileges. A backed-up group policy object (backup) 434 can later be returned to the directory service 202, either via a restore operation (limited to its original domain when created) or an import operation (into another group policy object in any domain), as described below. Note that the backup function 430 also serves as an export function. Additional details on the backup operation are described below.

Figure 5:
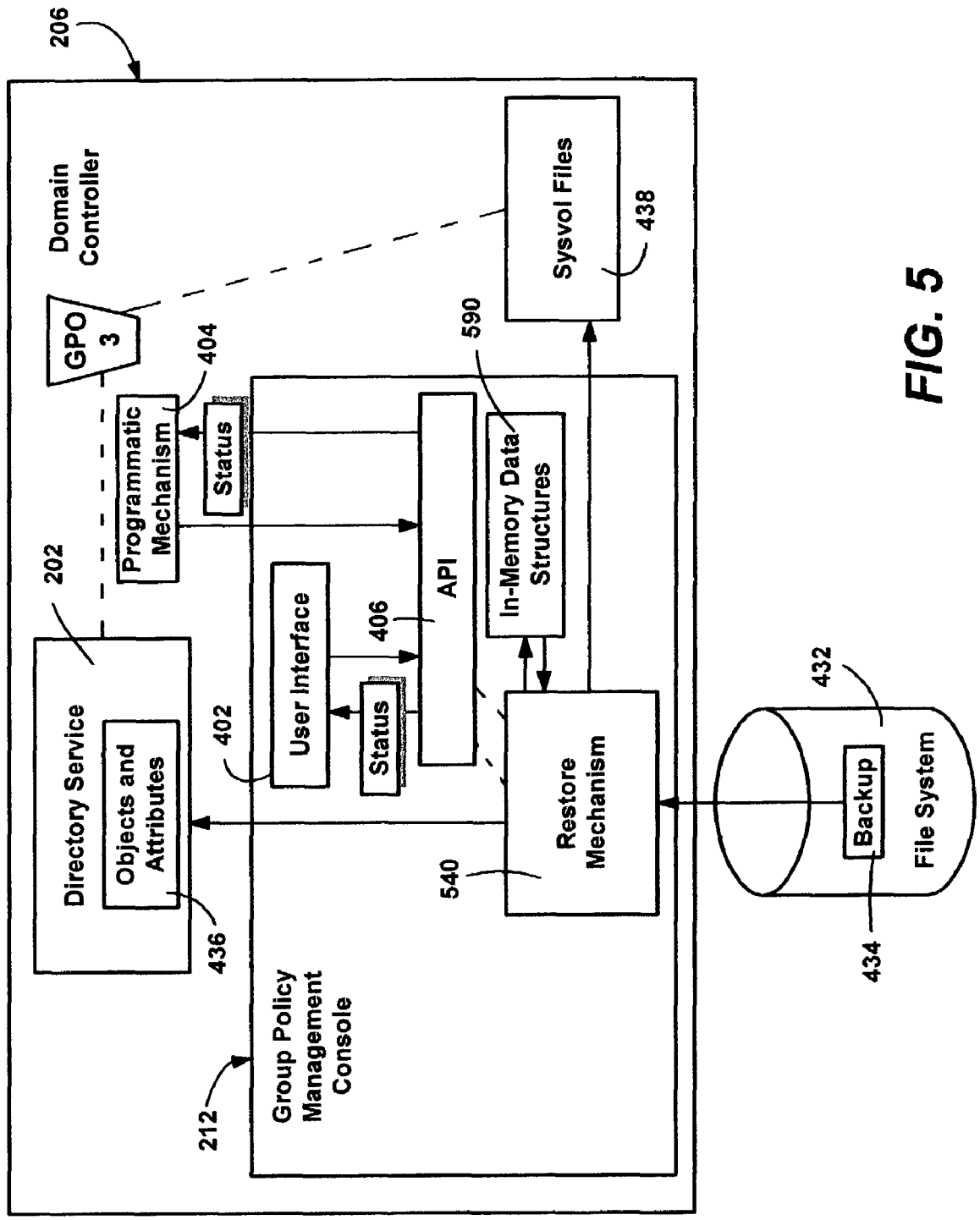
FIG. 5 is a block diagram generally representing a restore mechanism for restoring a group policy object from a backup in persistent storage, in accordance with an aspect of the present invention.

The restore operation, generally represented by the restore mechanism 540 in FIG. 5, returns the contents of a backed-up group policy object (e.g., backup 434) such that the group policy object GPO3 is in the same state as it was in when the backup was performed. Note that the restore operation is only valid in the domain where the group policy object GPO3 was originally created, in this example, the domain D2 of FIG. 2. Further, note that the restore returns the state whether the original group policy object still exists (and thus essentially can be considered overwritten by the restored group policy object) or was deleted since the backup (and thus essentially can be considered re-created to the extent possible by the restore operation). A restore operation restores the same group policy object GUID, the same settings and the same discretionary access control lists (DACLs) to the group policy object. However, a restore operation does not modify links to the group policy object, as those are attributes of the scope of management (SOM, e.g. site, domain, or organizational unit) to which the group policy object is linked, and not group policy object-specific data. Additional details on the restore operation are described below.

Figure 6:
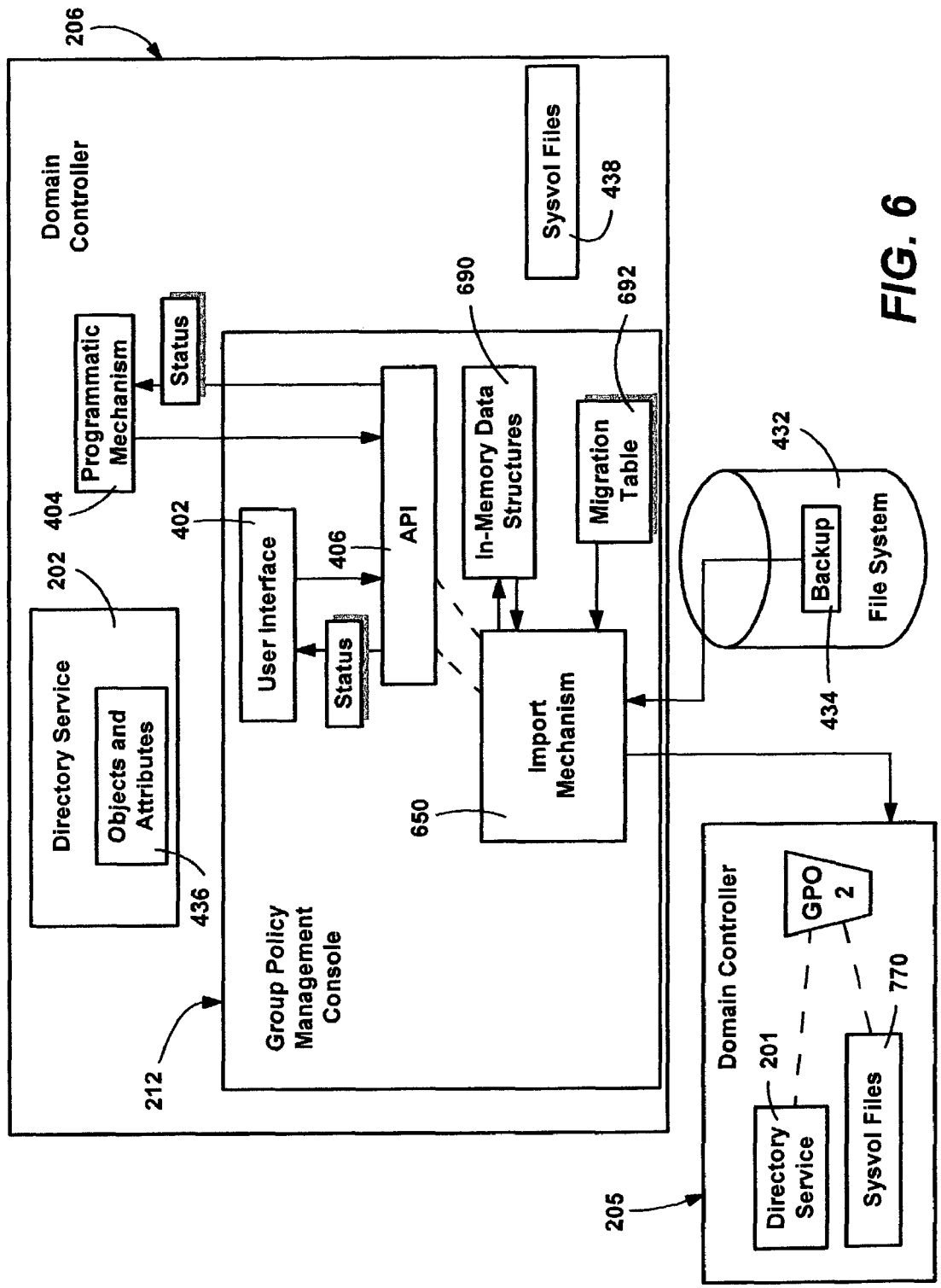
FIG. 6 is a block diagram generally representing an import mechanism for importing data from a backup in persistent storage to an existing group policy object, in accordance with an aspect of the present invention.

The import operation, generally represented in FIG. 6 via the restore mechanism 650, transfers the backed up settings corresponding to one (source) group policy object to another (destination) group policy object (e.g., GPO2) that is importing those settings, but does not transfer other data such as the GUID or DACLs, (note that for global uniqueness, the GUID has to be different for each different group policy object). Note that the import operation can import settings into another group policy object in the same domain, or as represented in the example of FIG. 6, can operate across domains, as well as across forests, (where a forest is a grouping of domains). The source group policy object comprises any group policy object that is backed-up in the file system 432 and selected by the administrator as the source, such as the backup 434, although it is feasible to use a non-backed up group policy object as the source, such as by making a temporary backup, performing the import operation, and then deleting the temporary backup. The destination group policy object GPO2 comprises an existing group policy object in the directory service that has been specifically targeted by the administrator for import. An import erases any settings that previously existed within the destination group policy object GPO2 and replaces them with the settings of the source group policy object's backup 434. Because only the settings are transferred during the import, the existing GUID and the DACLs on the destination group policy object GPO2 are not modified, nor are any links that point to this group policy object, nor any link to the WMI filter (that is, if one exists). As will be understood below from additional details on the import operation, an import is similar to a copy operation as also described below, except that the import operation involves the file system 432.

Figure 7:
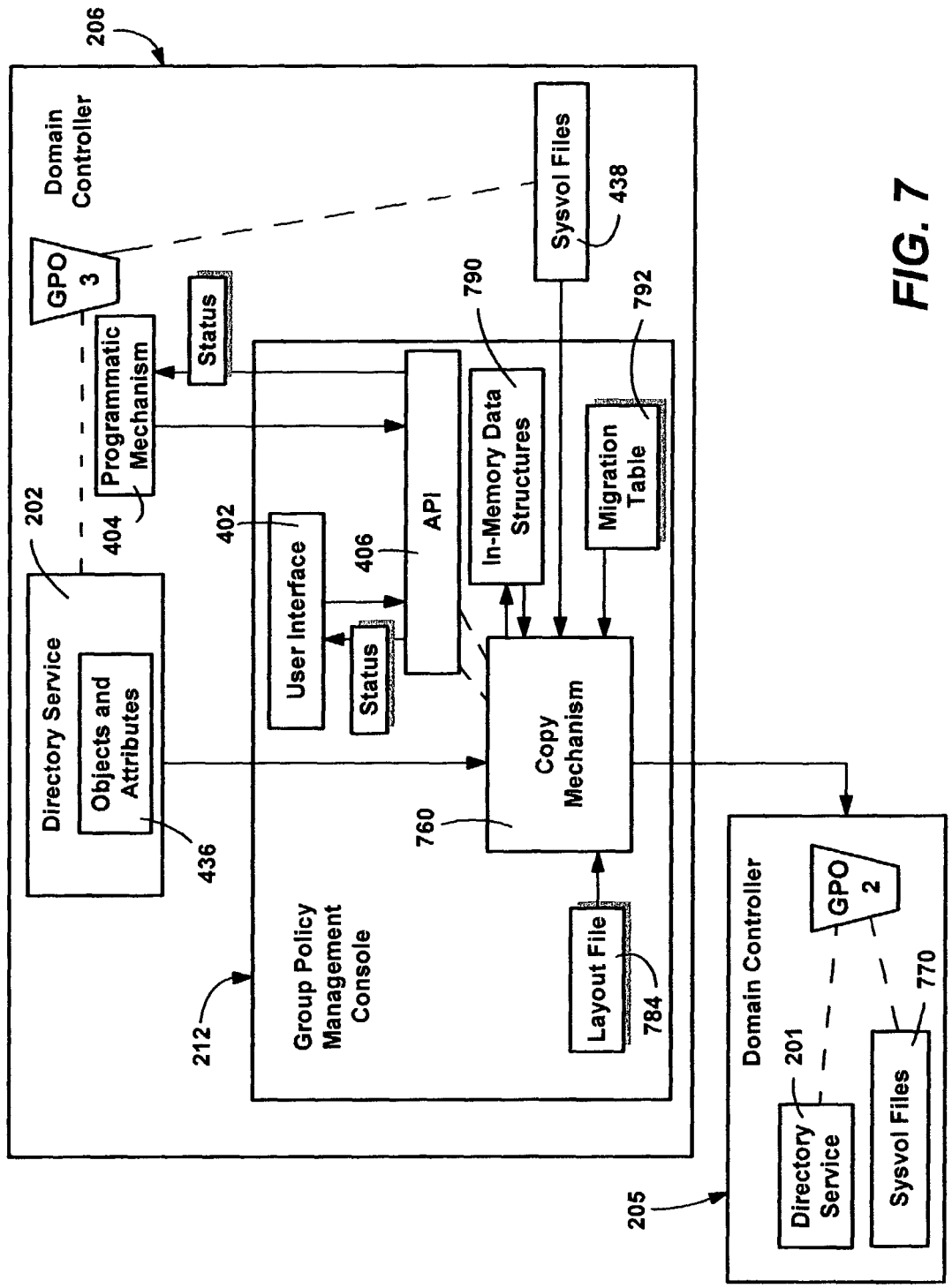
FIG. 7 is a block diagram generally representing a copy mechanism for copying data from an existing group policy object to a new group policy object, in accordance with an aspect of the present invention.

FIG. 7 generally represents the copy operation in a cross domain example (via the copyTo function/mechanism 760), which like an import operation, transfers only the settings from a source group policy object, by copying the settings from a source group policy object into a new group policy object. Unlike an import, however, the file system is not involved, as the source group policy object is a live group policy object (e.g., GPO3) in the directory, rather than being a backed-up group policy object in the file system. Further, the destination is a newly created group policy object (shown as GPO5) with a new GUID that is created as part of the copy operation. The new group policy object GPO5 will have the default DACLs for group policy objects, although alternatively the DACLs may be optionally preserved from the source. Note that a copy operation does not transfer links to the new group policy object. Like the import operation, the copy operation can be used with group policy objects in the same domain, across domains, and across forests. For purposes of explanation, FIG. 7 shows a cross-domain example, such as to copy the settings of the group policy object GPO3 (of domain D2, FIG. 2) to the group policy object GPO2 (of domain D1, FIG. 2), however it is understood that copy operations can be within the same domain.

As described below with reference to FIGS. 9 and 10, in order to facilitate cross-domain and cross-forest copy or import operations, the group policy management console enables an administrator to map (e.g., via a migration table) certain settings to new values during import and copy operations. Mapping includes security principal mapping, by which an administrator can map security principals (which can be referenced in the group policy object) using the same security identifier (SID), or based on an exact match of the relative name of the security principal in the target domain, or based on a custom mapping supplied by the administrator, or the setting containing this security identifier can be dropped. Other mapping includes path mapping, which allows the administrator to specify a custom mapping based on source and destination paths. This mapping is used for folder redirection, software installation, and scripts.

As is understood, each of the group policy object operations primarily comprise two sub-operations, an initialization sub-operation and a saving sub-operation, that involve a memory and may involve a persistent storage. For example a backup operation initializes data into memory from a group policy object, and saves data to a backup location in a persistent storage, whereas an import or restore operation essentially does this in reverse, that is, initializes data from the backup location, and saves (at least some of) the corresponding data into a group policy object. A copy operation initializes data from one group policy object, creates a new group policy object in a destination domain, and saves corresponding data to that new group policy object.

The group policy management console implementation of the group policy object operations is driven by a layout (configuration) file (e.g., 484, FIG. 4) that defines the data relevant to each group policy extension, wherein examples of extensions include those directed to administrative template settings, security settings, software installation, folder redirection, Internet Explorer maintenance, scripts and remote installation services. In other words, to initialize the data into an in-memory data structure from a group policy object, the group policy object layout file 484 (e.g., an XML file) is loaded to get a list of the extensions for which the layout is known. Based on the layout file 484, the source group policy object is scanned for the extensions specified in the group policy object, and an in-memory data structure 490 for the layout is pruned to remove any extensions that were not specified. The directory service data is read, and file system configurations are setup. If any custom processing code is specified, the code is also called into with appropriate operation parameters to do any additional processing (e.g., pre-processing and post-processing).

The layout file e.g., 484 in FIG. 4, installed as part of the group policy management console 212, is organized based on such different extensions, with each extension specifying its respective data in separate sections. Note that the directory service and sysvol attributes corresponding to the group policy object (and not specific extensions) are also backed up in a separate section. The layout file 484 also allows specification of custom code, to allow for pre-processing and post-processing of these nodes. Processing codes control whether the data corresponding to it need to be processed, whether additional data need to be extracted from the extension data to get a description of the data that can be specified in a migration table (described below), and/or whether to migrate the old entries to new entries based on a migration table when setting the data in a group policy object. Migration and migration tables allow an administrator to manage cross-domain copy and import operations, as described below.

In the layout file 484, one main type of element (e.g., XML node) that specifies the data that needs to be backed up comprises the file system object (directory). This element allows for specifying the file system path for backing up the group policy object, and also for specifying whether to do the operation recursively under the node. Another main type of element that specifies the data that needs to be backed up comprises the file system object (file), which allows for specifying a file (or files) that need to be backed as part of backing up the group policy object. A directory service object node allows for specifying the path to the directory service object that needs to be backed up (as part of backing up the group policy object), and provides support for backing up different directory service attributes on the object, which is also allowed by the schema. For these elements, the various parts can be defined relative to the group policy object, using custom variables. In addition, these elements allow for specifying the backup and restoration of security descriptors. Simple regular expressions are also allowed in the specification, to handle some of the common specification cases.

The following table sets forth an example file object representation, which defines backing up startup scripts and their dependencies. These are stored as files and directories under the startup directory in sysvol. In this example, these sets of files will get recursively copied and created:

```
< FSObjectFile bkp:Path="%GPO_MACH_FSPATH%\Scripts\
Startup\*"bkp:Recursive="true"/>
```

The following table sets forth an example directory service representation, which defines the IPSec (Internet Protocol security) directory service object and attributes in the group policy object that need to be backed up using a group policy object relative path. The representation also shows specification of a custom processing function that gets called during the processing:

```
<DSObject bkp:Path="cn=IPSEC,cn=Windows,cn=Microsoft,
%GPO_MACH_DSPATH%"
bkp:ObjectClass="ipsecPolicy"
bkp:ReEvaluateFunction=
"IPSecValidateLink">
    <DSAttributeMultiString bkp:DSAttrName="description"/>
    <DSAttributeString bkp:DSAttrName="ipsecName"/>
    <DSAttributeString bkp:DSAttrName="ipsecID"/>
    <DSAttributeBinary bkp:DSAttrName="ipsecData"/>
    <DSAttributeDWORD bkp:DSAttrName="ipsecDataType"/>
    <DSAttributeMultiString bkp:DSAttrName="ipsecOwnersReference"/>
</DSObject>
```

In general, the group policy management console layout is arranged according to a schema that makes it straightforward to specify data for simple extensions, whereas more complicated extensions should be able to perform a dynamic evaluation, if required. The schema specifies the allowed types of objects and attributes that can be specified in the GPO layout. New extensions can also be added to the layout file in a manner conforming to the types specified in the schema. An example schema is represented in the table below:

```
<?xml version="1.0" encoding="utf-8" ?>
<xsd:schema
targetNamespace="http://www.microsoft.com/GroupPolicy/GPOOperations"
attributeFormDefault="qualified" elementFormDefault="qualified"
xmlns="http://www.microsoft.com/GroupPolicy/GPOOperations"
xmlns:xsd="http://www.w3.org/2001/XMLSchema">
    <xsd:simpleType name="GUID">
        <xsd:restriction base="xsd:string">
            <xsd:pattern value="\{[0-9A-Fa-f]{8}-[0-9A-Fa-f]{4}-[0-9A-Fa-f]{4}-[0-
```

-continued

```
9A-Fa-f]{4}-[0-9A-Fa-f]{12}\}"/>
      </xsd:restriction>
    </xsd:simpleType>
    <xsd:attributeGroup name="DSATTRIBUTES_ag">
      <xsd:attribute name="DSAttrName" type="xsd:string" use="required" />
      <xsd:attribute name="ReEvaluateFunction" type="xsd:string"
use="optional" />
    </xsd:attributeGroup>
    <xsd:complexType name="DSATTRIBUTEBINARY_t">
      <xsd:sequence>
        <xsd:element name="DSValue" type="xsd:hexBinary" minOccurs="0"
maxOccurs="1" />
      </xsd:sequence>
      <xsd:attributeGroup ref="DSATTRIBUTES_ag" />
    </xsd:complexType>
    <xsd:complexType name="DSATTRIBUTESTRING_t">
      <xsd:sequence>
        <xsd:element name="DSValue" type="xsd:string" minOccurs="0"
maxOccurs="1" />
      </xsd:sequence>
      <xsd:attributeGroup ref="DSATTRIBUTES_ag" />
    </xsd:complexType>
    <xsd:complexType name="DSATTRIBUTEEXPSTRING_t">
      <xsd:sequence>
        <xsd:element name="DSValue" type="xsd:string" minOccurs="0"
maxOccurs="1" />
      </xsd:sequence>
      <xsd:attributeGroup ref="DSATTRIBUTES_ag" />
    </xsd:complexType>
    <xsd:complexType name="DSATTRIBUTEDWORD_t">
      <xsd:sequence>
        <xsd:element name="DSValue" type="xsd:long" minOccurs="0"
maxOccurs="1" />
      </xsd:sequence>
      <xsd:attributeGroup ref="DSATTRIBUTES_ag" />
    </xsd:complexType>
<xsd:complexType name="DSATTRIBUTEMULTISTRING_t">
    <xsd:sequence>
      <xsd:element name="DSValue" type="xsd:string" minOccurs="0"
maxOccurs="unbounded" />
    </xsd:sequence>
    <xsd:attributeGroup ref="DSATTRIBUTES_ag" />
</xsd:complexType>
<xsd:complexType name="DSATTRIBUTEMULTIDWORD_t">
    <xsd:sequence>
      <xsd:element name="DSValue" type="xsd:long" minOccurs="0"
maxOccurs="unbounded" />
    </xsd:sequence>
    <xsd:attributeGroup ref="DSATTRIBUTES_ag" />
</xsd:complexType>
<xsd:complexType name="BACKUPOBJECT_t">
    <xsd:sequence minOccurs="0" maxOccurs="unbounded">
      <xsd:element ref="BackupObject" />
    </xsd:sequence>
    <xsd:attribute name="Path" type="xsd:string" use="required" />
    <xsd:attribute name="SourceExpandedPath" type="xsd:string"
use="optional" />
    <xsd:attribute name="DestinationExpandedPath" type="xsd:string"
use="optional" />
    <xsd:attribute name="Location" type="xsd:string" use="optional" />
    <xsd:attribute name="IsDeleted" type="xsd:string" use="optional" />
    <xsd:attribute name="ReEvaluateFunction" type="xsd:string"
use="optional" />
</xsd:complexType>
<xsd:element name="BackupObject" type="BACKUPOBJECT_t" abstract="1" />
    <xsd:complexType name="DSOBJECT_t">
      <xsd:complexContent>
        <xsd:extension base="BACKUPOBJECT_t">
          <xsd:sequence>
            <xsd:sequence minOccurs="0" maxOccurs="1">
              <xsd:element name="SecurityDescriptor" type="SECURITYDESCRIPTOR_t"
/>
            </xsd:sequence>
            <xsd:sequence minOccurs="0" maxOccurs="unbounded">
              <xsd:choice>
                <xsd:element name="DSAttributeString" type="DSATTRIBUTESTRING_t"
/>
                <xsd:element name="DSAttributeExpandedString"
type="DSATTRIBUTEEXPSTRING_t" />
                <xsd:element name="DSAttributeMultiString"
```

```
type="DSATTRIBUTEMULTISTRING_t" />
                <xsd:element name="DSAttributeDWORD" type="DSATTRIBUTEDWORD_t" />
                <xsd:element name="DSAttributeMultiDWORD"
type="DSATTRIBUTEMULTIDWORD_t" />
                <xsd:element name="DSAttributeBinary" type="DSATTRIBUTEBINARY_t"
/>
              </xsd:choice>
            </xsd:sequence>
          </xsd:sequence>
          <xsd:attribute name="ObjectClass" type="xsd:string" />
        </xsd:extension>
      </xsd:complexContent>
    </xsd:complexType>
    <xsd:element name="DSObject" type="DSOBJECT_t"
substitutionGroup="BackupObject" />
    <xsd:complexType name="SECURITYDESCRIPTOR_t">
      <xsd:simpleContent>
        <xsd:extension base="xsd:string">
          <xsd:attribute name="ReEvaluateFunction" type="xsd:string"
use="optional" />
        </xsd:extension>
      </xsd:simpleContent>
    </xsd:complexType>
    <xsd:complexType name="FSOBJECTFILE_t">
      <xsd:complexContent>
        <xsd:extension base="BACKUPOBJECT_t">
          <xsd:sequence minOccurs="0" maxOccurs="1">
            <xsd:element name="SecurityDescriptor" type="SECURITYDESCRIPTOR_t"
/>
          </xsd:sequence>
          <xsd:attribute name="Recursive" type="xsd:boolean" use="optional"/>
        </xsd:extension>
      </xsd:complexContent>
    </xsd:complexType>
    <xsd:element name="FSObjectFiie" type="FSOBJECTFILE _t"
substitutionGroup="BackupObject" />
    <xsd:complexType name="FSOBJECTDIR_t">
      <xsd:complexContent>
        <xsd:extension base="BACKUPOBJECT_t">
          <xsd:sequence minOccurs="0" maxOccurs="1">
            <xsd:element name="SecurityDescriptor" type="SECURITYDESCRIPTOR_t"
/>
          </xsd:sequence>
          <xsd:attribute name="Recursive" type="xsd:string" use="optional"/>
        </xsd:extension>
      </xsd:complexContent>
    </xsd:complexType>
    <xsd:element name="FSObjectDir" type="FSOBJECTDIR_t"
substitutionGroup="BackupObject" />
    <xsd:complexType name="GROUPPOLICYEXTENSION_t">
      <xsd:sequence>
        <xsd:sequence minOccurs="0" maxOccurs="unbounded">
          <xsd:choice>
            <xsd:element name="FSObjectDir" type="FSOBJECTDIR_t" />
            <xsd:element name="FSObjectFile" type="FSOBJECTFILE_t" />
            <xsd:element name="DSObject" type="DSOBJECT_t" />
          </xsd:choice>
        </xsd:sequence>
      </xsd:sequence>
      <xsd:attribute name="ID" type="GUID" use="required" />
      <xsd:attribute name="DescName" type="xsd:string" use="optional" />
    </xsd:complexType>
    <xsd:complexType name="SECURITYGROUP_t">
      <xsd:sequence minOccurs="0" maxOccurs="1">
        <xsd:element name="Sid" type="xsd:string"/>
        <xsd:element name="AccountName" type="xsd:string"/>
        <xsd:element name="Type" type="xsd:string"/>
        <xsd:element name="NetBIOSDomainName" type="xsd:string"/>
        <xsd:element name="DnsDomainName" type="xsd:string"/>
      </xsd:sequence>
      <xsd:attribute name="Source" type="xsd:string" use="optional" />
    </xsd:complexType>
    <xsd:complexType name="SECURITYGROUPS_t">
      <xsd:sequence minOccurs="0" maxOccurs="unbounded">
        <xsd:element name="Group" type="SECURITYGROUP_t"/>
      </xsd:sequence>
    </xsd:complexType>
    <xsd:complexType name="FILEPATHS_t">
      <xsd:sequence minOccurs="0" maxOccurs="unbounded">
        <xsd:element name="Path" type="xsd:string"/>
```

```
        </xsd:sequence>
    </xsd:complexType>
    <xsd:complexType name="GROUPPOLICYCORESETTINGS_t">
        <xsd:sequence>
            <xsd:element name="ID" type="xsd:string"/>
            <xsd:element name="Domain" type="xsd:string"/>
            <xsd:element name="SecurityDescriptor" type="xsd:string"/>
            <xsd:element name="DisplayName" type="xsd:string"/>
            <xsd:element name="Options" type="xsd:long" />
            <xsd:element name="UserVersionNumber" type="xsd:long"/>
            <xsd:element name="MachineVersionNumber" type="xsd:long"/>
            <xsd:element name="MachineExtensionGuids" type="xsd:string">
            <xsd:element name="UserExtensionGuids" type="xsd:string"/>
            <xsd:element name="WMIFilter" type="xsd:string"/>
            <xsd:element name="WMIFilterName" type="xsd:string" minOccurs="0" maxOccurs="1"/>
        </xsd:sequence>
    </xsd:complexType>
    <xsd:complexType name="GPO_t">
        <xsd:sequence>
            <xsd:sequence minOccurs="0" maxOccurs="1">
                <xsd:element name="SecurityGroups" type="SECURITYGROUPS_t"/>
            </xsd:sequence>
            <xsd:sequence minOccurs="0" maxOccurs="1">
                <xsd:element name="FilePaths" type="FILEPATHS_t"/>
            </xsd:sequence>
            <xsd:sequence minOccurs="0" maxOccurs="1">
                <xsd:element name="GroupPolicyCoreSettings" type="GROUPPOLICYCORESETTINGS_t"/>
            </xsd:sequence>
            <xsd:sequence minOccurs="0" maxOccurs="unbounded">
                <xsd:element name="GroupPolicyExtension" type="GROUPPOLICYEXTENSION_t" />
            </xsd:sequence>
        </xsd:sequence>
    </xsd:complexType>
    <xsd:simpleType name="GROUPPOLICYBACKUPTYPE_t">
        <xsd:restriction base="xsd:string">
            <xsd:enumeration value="GroupPolicyBackupTemplate"/>
            <xsd:enumeration value="GroupPolicyBackUpInstance"/>
        </xsd:restriction>
    </xsd:simpleType>
    <xsd:complexType name="GPBACKUPSCHEME_t">
        <xsd:sequence>
            <xsd:element name="GroupPolicyObject" type="GPO_t" />
        </xsd:sequence>
        <xsd:attribute name="version" type="xsd:float" use="required" />
        <xsd:attribute name="type" type="GROUPPOLICYBACKUPTYPE_t" use="optional" />
    </xsd:complexType>
    <xsd:element name="GroupPolicyBackupScheme" type="GPBACKUPSCHEME_t">
    </xsd:element>
</xsd:schema>
```

In keeping with an aspect of the present invention, during the various operations, a group policy object is not left in an intermediate (e.g., not fully-transferred) state during the transitions that occur, at least to a very high probability. To this end, the data transfer is largely transactional in nature. In the unlikely event that a group policy object is in such an intermediate state, such as due to a network failure at an inopportune time, the group policy object remains marked (e.g., via a rename of one of its corresponding files) in a manner that prevents the group policy object from being used, and the administrator is notified that the requested operation was not successful.

More particularly, group policy management console operations are controlled from client machines or domain controllers, with the modifications to the files and objects of the Active Directory® service performed over the network. Since these modifications are done over network, a mechanism needs to be provided so that these group policy object operations are resilient with respect to network outages. At the same time, group policy usage may be based on clients periodically polling the applicable group policy objects for any changed data, and a mechanism needs to be provided so that clients cannot apply policies from a group policy object while modifications to the group policy object are taking place.

The group policy management console 212 provides these needed mechanisms, including by disabling the group policy object that is being modified into an error stage as part of restore and import operations (but not during backup and copy operations), whereby clients cannot apply policy from the disabled group policy object. To this end, a required file, sysvol file (e.g., gpt.ini) is renamed to a temporary name or location. When group policy clients poll the group policy objects, during an ongoing operation the client will detect a group policy object for which the sysvol part is not accessible because of the missing gpt.ini file. As a result client will not apply policies during this refresh interval. At the end of the operation, the sysvol gpt.ini file is renamed (replaced), whereby thereafter, the client will start applying policies correctly once the operation is complete. In the event of an error, the group policy object remains disabled until otherwise corrected, e.g., by a new restore operation that completely starts over.

Further, many parts of the data handling of the operations take place inside a location within the group policy object itself, providing a transactional-like quality to the operation that avoids a possible intermediate state, as well as preserving GUIDs when possible. To this end, an operation updates a staging area within the group policy object, leaving the original data intact. For example, during a restore, the backup is read into the staging area (shadow locations comprising a user staging area and a computer staging area) of the group policy object. As a result, the original data is at least temporarily maintained, such that any unfinished operation can be easily canceled out by removing the staging area's data. If not canceled, once the staging area is completely updated, the existing (old) group policy data is moved to an "old" location (areas for computer and user data), and the staging area's data is moved into the main group policy data location. Only when these steps are completed successfully is the old location's data deleted, such that it can be rolled back if necessary. Whether canceled and rolled back to its previous state or completed into its new state, the required gpt.ini file is set back (renamed back) in the sysvol of the group policy object, whereby clients may start applying the group policy object. Note that if there is an error that prevents the client and domain controller from communicating, for example a network error while moving the staging area data to the main group policy data locations, thereby leaving the group policy object in an intermediate state, the rename set back does not occur, leaving the group policy object in the disabled state, thereby preventing it from being used until otherwise corrected.

In actual practice, the performance of the various operations can be relatively lengthy from an administrator's perspective. In accordance with another aspect of the present invention, there is provided a cancel mechanism that allows an administrator to cancel an operation that is in progress. For example, the user interface 402 (FIG. 4) may display a progress dialog having with an actuable cancel button.

Note that the progress dialog may be more than a simple progress indicator display with cancel button; indeed, as further described in the aforementioned patent application entitled "Support Mechanisms for Improved Group Policy Management User Interface," the progress dialog may comprise a container and user interface component into which group policy objects that are involved in the operation are added, along with information as to the operation that is to be performed on that object (or objects). Once the object or objects have been added to the progress dialog, a specific method to backup, restore, import or copy is called by the progress dialog to perform the operation. In other words, the progress dialog is called to initiate the operation, but the progress dialog itself drives the operation, including calling progress-related methods of the operation's method to obtain progress information, handle progress data sent from the operation's method, and/or handling cancel requests.

During the operations, status messages may be collected, which are arranged to provide a relatively extensive amount of relevant information to the administrator, significantly beyond a simple errorcode. For example, in addition to providing the error condition, information may be provided identifying the object that was being accessed (or attempted to be accessed) when the error occurred, data about the setting that caused the failure, and/or a rich description. As can be understood, because of the large number and variety of objects and other data that make up a group policy object, such extensive error reporting is highly beneficial to administrators.

Backup Operation

Turning to an explanation of the backup operation, the primary functionality initializes data from a group policy object and then saves that data into a backup location. As represented in FIG. 4, to provide for backup operations, the group policy management console 212 provides a backup engine 430 that is driven by a layout (configuration) file 484. The layout file 484 contains data corresponding to each of the client-side extension data, which the backup engine 430 uses to extract the data from the specified group policy object, e.g., GPO3, and save it into a persistent format, e.g., backup 434.

The group policy management console 212 thus provides the mechanism 430 to backup a group policy object onto a file system-based location that is specified by the administrator. The administrator can also provide an optional description for the backup. As described below, this backup is self-contained, (e.g., as a unique directory within a top level directory specified by the administrator), and can be copied or moved as a whole into a different file location. Backups are designed such that a backup contains the relevant data extracted from the source domain, with no future lookups being needed to retrieve any information from the source domain when the backups are later used, such as when restoring a group policy object. Note that a backed-up group policy object also provides the source of information for an import operation, and thus the backup mechanism 430 serves as an export mechanism, (although it is feasible to also provide a separate export mechanism).

To deal with access rights management during the group policy object backup operation, permissions are required, such as read access to the group policy object GPO3, and write access to the file system location, e.g., a main backup directory that holds the individual backup directories. Group policy objects can be backed up either from an appropriate user interface 402 of the management console 212, or programmatically (e.g., via scripting). An API layer or the like (e.g., via object methods) is provided to facilitate the communication.

Figure 8:
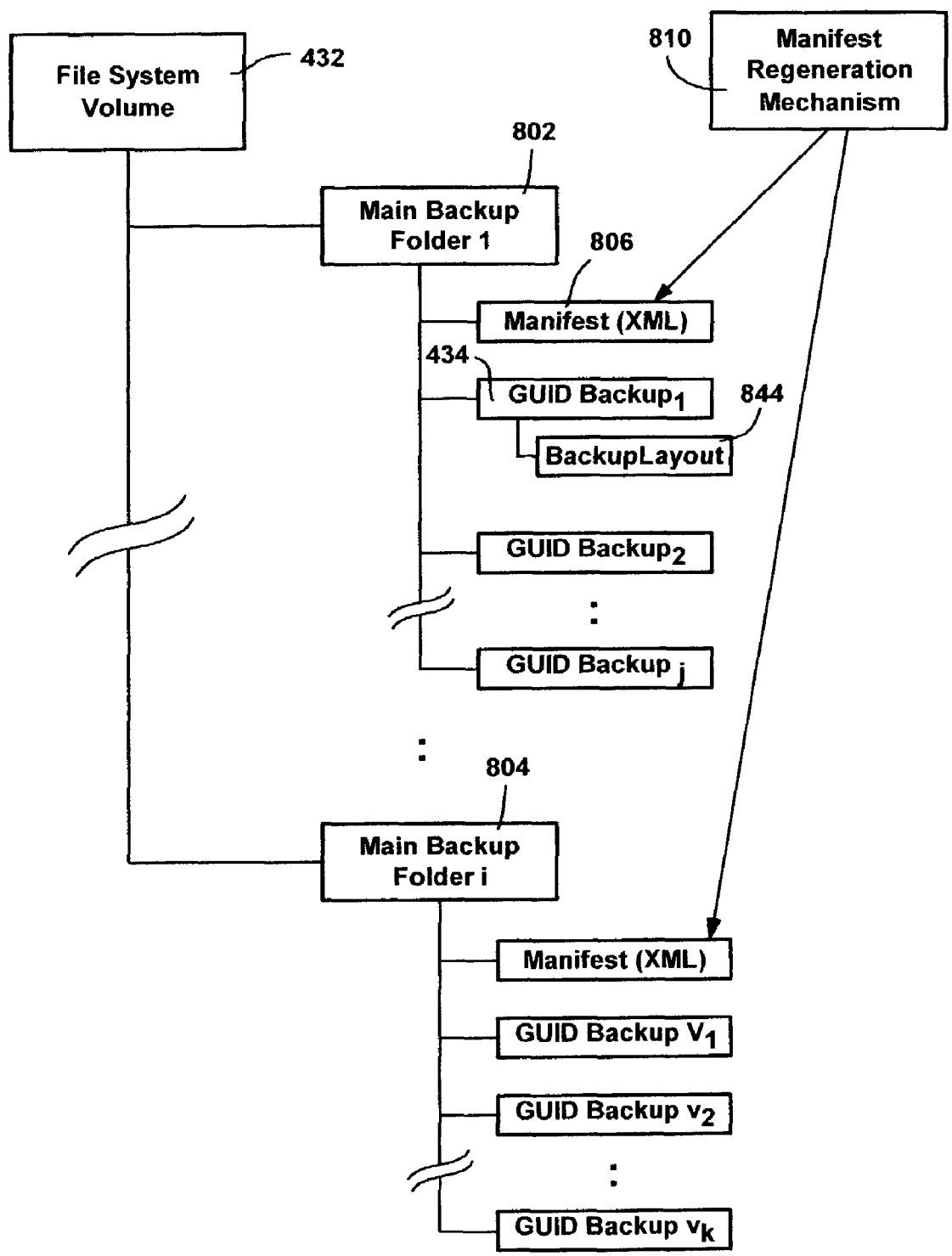
FIG. 8 is a representation of backed up group policy objects and manifests arranged in a hierarchy that facilitates backup management in accordance with an aspect of the present invention

In one implementation, when requesting a backup, the administrator specifies a file system location, such as a location comprising a single top-level directory in the file system where the backed-up group policy objects are stored. As generally represented in FIG. 8, within this single directory 802, backups of multiple group policy objects (e.g., GUID-identified backup$_1$-backup$_j$) can be stored, including multiple backups of the same group policy object at different times (e.g., GUID-identified backups of different versions backupv$_1$-backupv$_k$ of the same group policy object) can be stored. Each backup is ensured uniqueness because it has its own GUID (independent of the GPO GUID). Each backup can be identified by the administrator using any of the following: friendly name of the group policy object, GUID of the group policy object, date/time stamp, and domain identification. Further, note that the same file system volume can contain multiple main backup folders, such as represented by folders 802 and 804 in FIG. 8, and other file system volumes can similarly contain such main backup folders.

To perform a backup operation, a new directory (GUID-named) is created under administrator-specified directory, that is, the main directory 802 (FIG. 8) where the backup related data will be stored. A global backup layout file 484 is read into memory from a group policy management console installation folder, such as the memory of a client machine or domain controller on which the administrator is running the group policy management console 212. The group policy object data is then collected, e.g., into an in-memory data structure 490, by reading the various files, objects and attributes, as described above. This collected data is saved at the root level, e.g., as a file 844 (backup.xml) in the new GUID-named directory that was created for it. Also, the sysvol part of the group policy object is copied to this GUID-named directory. An index file (e.g., also an XML file) of the main directory 802, referred to as a manifest 806, is updated with searchable attributes to provide quick search capabilities, as described below.

In this manner, the backup operation extracts relevant group policy object information and stores this in a file system-based location. The information includes the GUID and domain information of the group policy object. Domain information (e.g., both DNS name of the domain and GUID of the domain) is stored such that the group policy object can be restored, for example because a default group policy object has the same GUID regardless of its domain, whereby the domain's GUID distinguishes it from one in another domain. Both the DNS name and the domain's GUID are stored so that the APIs can handle a change in the name of the domain (for certain settings in the group policy object that are is dependent on the name of the domain), and a completely unrelated domain having the same name (because the settings can refer to domain information using other means, e.g., the SID of the domain or the GUID of the domain.) Other information includes the group policy object's settings, the DACLs on the group policy object and the WMI filter link (but not the filter itself, as described above).

With each backed-up group policy object, certain information is preserved for later reference by the administrator, including an XML report of the settings in the group policy object, whereby the group policy object settings can be efficiently viewed, including when it is not in the domain server. Other information includes a date/time stamp of when the group policy object was backed-up, and a description comprising any comments supplied by the administrator at the time of backup.

Note that components related to but outside of the group policy object are not backed up, such as links that are properties of the scope of management (SOM, e.g., domain, site or organizational unit). A SOM link is a separate object with its own permissions. Note that it is feasible to back up such links in conjunction with the group policy object, however by not backing up links, problems such as the administrator having rights to restore a group policy object, but not to restore such links, are avoided. Even if SOM link backup is attempted and the group policy object later restored, the administrator may not actually have backed up all such links, because of not having access during backup to each of the SOMs, for example. Moreover, the link position of a given link may change between time of backup and time of restore, whereby during restore, it is not clear what link position to give the link, thereby requiring user intervention to decide.

Similarly, contents of separate objects that are independent of the group policy object itself, and stored outside the group policy object, e.g., IPSec and external scripts, are not backed up. Thus, for example, a group policy object backup operation does not backup WMI filters, because the WMI filter is separate object that can be linked to multiple group policy objects. However, a group policy object backup operation does back up the link to a WMI filter. Note that backup and restore of WMI filters can be accomplished separately, e.g., via an import/export feature for WMI filters. Further, in this implementation, only the group policy object components that are stored in the group policy object sections in the directory service and on the sysvol are backed up. For example, extensions that store content outside of these locations are not backed up. System access control lists (SACLs) on the group policy object are also not backed up in this implementation.

For the backup to be fully successful, the GUID and domain of the group policy object, settings, DACLs, WMI filter link, XML report of the settings in the group policy object need to be successfully backed up. If any essential components are not completely transferred to the file system, then the backup is considered a failure, in which event the administrator is notified via a dialog and/or via an event log to explain what failed, and why. If the backup failed, any partially backed up information is deleted from the file system.

When backing up a group policy object, the backup engine 430 also attempts to resolve friendly names for SIDs, the IPSec Policy name and the WMI filter name, and store this in association with the backup. Note that if any of these fail, the backup can still be used for restoring other backed-up data. Thus, if certain nonessential data is not backed up, the backup can succeed, however the administrator is informed (e.g., via user interface and/or an event log) of the issue, e.g., certain security identifiers (SIDs) were not resolved. Further, when the administrator is performing an import from this group policy object, the administrator can choose to keep the unresolved SID as it is, or can drop/map it to some valid security principal via migration tables.

To summarize, backing up a group policy object places a copy of relevant group policy object data into a specified file system location, including the group policy object's GUID and domain identifier, group policy object settings, the discretionary access control list (DACL) on the group policy object, and the WMI filter link (but not the filter itself). The backup operation backs up components of a group policy object that are in the group policy object in the Active Directory® and in the group policy object file structure in sysvol, and in the example implementation, does not capture items stored outside the group policy object, such as WMI filters, links on a SOM to that group policy object, and/or IP Security policies, which are separate objects with their own set of permissions. Note that the link to a WMI filter is actually an attribute of the group policy object, so the link is included as part of the group policy object backup and restore operation even though the WMI filter itself is not, and likewise for an IP Security policy set in a group policy object. The backup also contains other data useful to administrators, such as an XML report of the group policy object settings, a date/time stamp, and the administrator-supplied description. Each backup is given a unique identifier, which allows for multiple group policy objects to be backed up to the same file system location. With the group policy management console 212, administrators can identify backups stored in a given file system location based on group policy object GUID, the group policy object friendly name, the date/time stamp of the backup, the domain name, and the description of the backup.

In accordance with another aspect of the present invention, the group policy management console 212 provides a way to manage the backups of the group policy objects. For example, backup management may provide a dialog box or the like for selecting the location of stored group policy object backups. In such a manage backups dialog, the administrator can sort, delete, restore, and view the backup settings for group policy objects. The dialog box displays the originating domain for the group policy object, the friendly name of the group policy object, the timestamp of the backup, a user supplied description when the backup was taken, and the group policy object GUID. An administrator has the option of selecting the display of only the latest version for each backed-up group policy object.

As described above with reference to FIG. 8, the backups are stored under a backup directory such as folder 802 that can contain multiple, individual backups, such as with each individual backup arranged in a subdirectory under the backup directory. The root of the subdirectory for a given backup contains an XML file that in turns contain information corresponding to the directory service objects and attributes that were extracted from the group policy object, details of the file system data extracted from the group policy object, the relevant security descriptor information, and extracted entries that can be used in a migration table. Other information in the file includes the group policy object information, such as its name, version number and so forth. The root directory also contains copies of files copied from the sysvol location. A report of the current settings in the backup is also stored along with the backup, and can be used to view the settings in the group policy object when it was backed up.

To facilitate efficient backup management, the main backup folder contains a manifest 806, such as in the form of an XML index file that has index-type data useful for searching for backups. In general, rather than enumerate and search the backup folders, of which there may be hundreds or even thousands, the manifest file 802 tracks the key information about the backups in the backup folder, which provides efficient location of the GUID-identified backups therein. To this end, the manifest 806 contains searchable attributes for efficient access during the search operations, including, for example, the name of the source group policy object, the domain of the source group policy object, any administrator-specified comments, and a domain GUID.

Because the actual backup folder contents are folders and files of a file system, the backup folder contents can be changed like any other files and folders. For example, an administrator with proper access rights may modify the main backup folder's contents through traditional file system APIs, such as to copy other backups to the main folder, or delete backups. In such an event, the manifest does not reflect to true state of the main backup folder contents.

To prevent such inconsistencies, whenever the manifest file 806 is accessed via the interfaces (other than interfaces related to backup) of the group policy management console 212, e.g., through search interfaces therein, the group policy management console checks whether the manifest needs to be dynamically computed, and if so, will automatically regenerate the manifest. Note that during a backup operation the manifest is automatically regenerated, since by its nature a backup operation updates the contents of the directory. For example, when accessed through such a (non-backup) interface, before being relied upon, the manifest file contents may be first checked against the actual folder contents to ensure it is still valid, that is, whether the actual backups match those listed in the manifest, such as with respect to name and timestamp. If not valid, the manifest is automatically regenerated based on the actual folder contents, whereby it is no longer invalid. This is represented in FIG. 8 by the manifest regeneration mechanism 810, which may be incorporated into the group policy management console 212. Note that the manifest is regenerated in memory, and only if there is write access to the file system location is the manifest rewritten to the file system (during a restore or import, write access may not be available).

Restore Operation

In accordance with another aspect of the present invention, as represented in FIG. 5, the restore operation takes an existing, group policy object previously backed-up in the file system, such as the backup 434, and re-instantiates the group policy object (e.g., GPO3) in the domain. In general, the purpose of a restore is to reset a specific group policy object back to the identical state that the group policy object was in when it was backed up. To restore a group policy object, the group policy management console 212 provides a restore mechanism 540 accessible via an appropriate interface, as represented in FIG. 5. Note that the various settings are extracted from the backup 434 to restore the group policy object GPO3 back into the domain, whether the original group policy object exists, or does not, in which event it is re-created from the backup, to the extent possible.

Because a restore operation is specific to a particular group policy object, the restored group policy object contains the same GUID, and has to be in the domain of the original group policy object. A restore operation is thus only used to restore a group policy object to its domain; attempts to restore group policy objects across domains would not be valid.

To restore saved data into a group policy object, the group policy object data specified in the file system location, the backup 434, is added to the actual group policy object. To this end, files are copied from the specified backup location into the in-memory structure 590. Custom code, if specified, is called into to do any pre-processing and post-processing operations, and actions are taken so that client processing is kept low. The restore operation restores the various backed-up components of the group policy object, including the GUID, settings, DACLs and links to WMI Filters. A restore operation does not restore links to SOMs, but it is feasible to do so provided those links are previously backed up. As described above, for an existing group policy object, the restore operation is generally performed transactionally to allow rollback, e.g., including by first copying the restore data to the staging area logically within the group policy object, then copying the current data to an old area, and copying the restore data from the staging area to become the current data.

An administrator may initiate a restore operation via the user interface 402 of the group policy management console 212, e.g., by selecting an existing, backed-up group policy object and choosing a "Restore from backup . . ." context menu option. In this case, when the administrator looks in the main backup directory for group policy objects, the administrator will only see backed up group policy objects that match the GUID of the selected group policy object.

The administrator can select a "Restore . . ." option from a "manage backups" dialog, which allows the user to restore any backed-up group policy object, whether a live one exists or not. In this event, when the administrator looks in a specific file system location for group policy objects, the user interface 402 displays backed-up group policy objects, regardless of their respective GUIDs, because the user has not targeted a specific group policy object. The user can also select the "Restore" option from within the "manage backups" dialog described above, and restore can be accomplished programmatically, e.g. via scripting.

In general, the restore operation works on a single group policy object at a time. However, this is a design choice rather than a requirement, and in alternative implementations it is feasible to restore more than one group policy object at once, e.g., via a "Restore all . . ." option or the like. Further, in such implementations, multiple group policy object backups may be selected for restore, e.g., from the manage backups dialog, but these restores may be handled one at a time, rather than in parallel.

As mentioned above, two general cases for a restore of a group policy object include restoration of a non-existing group policy object and restoration of an existing group policy object. In the non-existing case, the group policy object existed at some previous time, and hence was able have been backed up, but has since been deleted. Upon restore, a group policy object is re-created, with the same GUID as before. It may occur that some software installation packages of the group policy object are created with a new package GUID, e.g., some software installation packages in the object may be reanimated, as described below, otherwise they will be created with a new package GUID, as described below.

For restoration of an existing group policy object, the group policy object is live in the directory service 202, but the administrator has instructed the group policy management console to revert the group policy object to some pre-existing state of that group policy object, corresponding to a backup version. In order to avoid any intermediate state, the restore mechanism provides transactional support to the extent possible, e.g., successfully restore the group policy object as specified, or completely rollback to its state before the restore began. In the event that an intermediate state does occur, as described above, the group policy object that is in transition remains disabled and cannot be applied by policy recipients.

As described above, to achieve the goal of concluding in a known good state during a restore (or import) operation, the restore mechanism attempts to minimize the chances of not ending up in an intermediate state. More particularly, when restoring a group policy object, the restore mechanism creates staging directories inside the actual group policy object on sysvol (and similarly in Active Directory for the components of the GPO that are stored in Active Directory®) for the user and computer configuration sections (e.g. "userstaging" and "computerstaging") and the data is restored into these staging directories on sysvol (and similarly in Active Directory). The restore mechanism also renames a key file needed to use the group policy object, (e.g., GPT.ini to bakGPT.ini), and copies the original user and computer directories (the actual group policy object contents) to backup directories into locations inside the group policy object (e.g. "userold" and "computerold"). The restore mechanism then copies the staging directories to the final locations. This is an effective rename or move operation that is done by overwriting any existing files in the destination from the source, followed by deleting any extra files in the destination, because even though more costly, it minimizes replication-related errors. Note at this point that the original version of the group policy object is not lost completely and exists in the old directory, so the group policy object can be returned to its original state if need be (e.g. an error occurs during the operation). Once the effective rename or move operation is complete, the restore operation deletes the staging directories and the old directories, before renaming the key file back to what it was, (e.g., bakGPT.ini back to GPT.ini).

For example, a file replication service may be used to keep the sysvol part of group policy object synchronized. The replication service needs to handle files being replicated in many different kinds of environment, including cases in which files get moved, deleted and created on multiple domain controllers. Since replication service may not guarantee that the order of operations is preserved, a quick set of operations over the network on a set of files and directories may result in files and directories being orphaned, particularly when moving files and directories around on a sysvol.

The group policy management console handles these situations by not doing any moves during the sysvol operation of a group policy object, instead accomplishing the effect of a move by copying files over existing files, and deleting extra files. This allows the replication service to better track the files and directories, preventing orphans from being created.

It should be noted that the staging process described above that is used to provide transaction-like resilience for restore operations is also used when performing import operations, described below.

As can be appreciated, the vulnerable part of a transaction-like restore or import operation is between the time the operation initiates modification of the final destination folders and the time at which this effective move operation is completed. During this window, the group policy object is in an unknown state, and if an error occurs such that the computer on which the group policy management console is running can no longer communicate with the targeted domain controller (e.g. the network goes down), the group policy object cannot be recovered to a known good state, (without starting over when the cause of the failure is removed). Note that in the event of an error in which the computer running the group policy management console and the targeted domain controller can still communicate, the operation in general will be able to rollback to the original state of the GPO. Even if a group policy object restore/import fails at the wrong time such that a known good state cannot be achieved, clients are prevented from processing the group policy object because of the temporary rename of the key file during the operation. For example, if no gpt.ini file exists in a group policy object that a client attempts to process, clients will not process any new policy, and will keep their existing policy. In this case, clients will record this situation as an error in the event log.

Thus, a restore operation can succeed or fail. Success occurs when the settings and related attributes of the group policy object (ACLs, SOM links, WMI filter links) are fully restored. Failure occurs when the settings are not fully transferred back into the group policy object, in which case an error condition is returned to the administrator, e.g., via a dialog explaining the failure and its cause. In the event of a failure, if this was a restore of an existing group policy object, the group policy object is returned to its identical state that it was in before the restore operation was attempted. If not possible, the group policy object remains disabled, as described above.

Partial success is also possible and occurs when the settings are fully transferred back into the group policy object, but certain aspects of the group policy object are not identical to it prior state. For example, if the WMI filter to which a link refers is missing, the restore succeeds, but the restore mechanism drops the link to the WMI Filter and the administrator is notified that the WMI filter could not be found. Similarly, if an IPSec Policy is missing, the restore succeeds, but the link to the IPSec policy is dropped, and the administrator notified that the IPSec policy could not be found could not be found. Other than dropping the links in such situations, the group policy object is fully restored. Note that copy or import operations can also have partial success, as described below.

Note that in one alternative implementation, restore may be implemented by creating a new group policy object with a temporary GUID, and the settings imported into that group policy object, followed by changing the GUID from the temporary group policy object to the GUID of the group policy object to be restored. Such an alternative design provides increased resiliency, but does not work for the default domain policy and the default domain controller's policy in an environment in which the GUIDS of these group policy objects are hardcoded, and cannot be deleted. In this alternative, to restore a group policy object, a new group policy object is created with a temporary GUID, and the existing group policy object is changed to a temporary GUID. The GUID of the new group policy object is then changed to be the original GUID of the group policy object to be restored. If these operations succeed, the original group policy object is deleted. Conversely, if the last GUID rename fails, then the original GUID is renamed back to what it was.

With respect to security during restore, the permissions required to perform the restore depend on whether the administrator is restoring an existing group policy object or a deleted group policy object. For restoring an existing group policy object, the administrator is required to have edit settings, delete, and modify permissions, as well as read access to the backup share. Note that group policy object creation rights are not required. For restoring a deleted group policy object, the administrator is required to have the right to create new group policy objects in the domain, as well as read access to the backup share.

Further, higher level administrators can control, via policy, whether to allow restore (and import) to be performed if the user is not running the group policy management console locally on the targeted domain controller. These operations may be allowed by default, but the higher-level administrator can set a user-based policy that prevents this. Thus, for example, the system administrator can disable restore unless the operation is being performed locally on the domain controller that group policy management console is using for this domain. By performing the restore locally on the domain controller, network dependencies are eliminated, thereby substantially reducing the chances of a non-transactional result.

When restoring an existing group policy object, the version number is incremented to be one greater than the version number of the pre-existing live group policy object. This guarantees that the restored group policy object will be applied by new clients. When restoring a non-existing group policy object, the same version number as the backed up group policy object is used.

As can be appreciated, a number of changes can occur on a domain between the time of backup and restoration of a group policy object. For example, if a customer has deployed software applications using a group policy object and subsequently deletes that group policy object, upon restoring that group policy object, it is possible that any application deployment upgrade relationships for that software application that are maintained in the group policy object will be lost. In general, much of the deployment information, including upgrade relationships is based on having consistent GUIDs, including the GUID of the software installation package registration object in the directory service. As long the same GUID is preserved, the restore of the application will be seamless, however if not, problems arise, and for example, the original application will need to be uninstalled on the client machine, and thereafter again fully installed, and any upgrade relationships will be lost.

As a result, when restoring a deleted group policy object that contains software installation settings, application deployment data may be lost, and various other side effects are possible, depending on the circumstances under which the group policy object is restored. For example, when restoring a group policy object that has been deleted, it is possible that cross-group policy object upgrade relationships that upgrade applications in the group policy object being restored, if any, are not preserved after restore. A cross-group policy object upgrade is one where the administrator has specified that an application should upgrade another application, and the two applications are not in the same group policy object. Note that cross-group policy object upgrade relationships are preserved when applications (that are in the group policy object being restored) upgrade applications in other group policy objects. If the client has not yet seen that the group policy object has been deleted (either because the user has not re-logged on or rebooted since the deletion of the group policy object), and the application was deployed with the option to "Uninstall this application when it fall out of scope of management," then the next time the client logs on, published applications that the user has previously installed will be removed, and assigned applications will be uninstalled before re-installation.

This behavior occurs because when the group policy object is restored, the package registration object in the Active Directory service that represents the application is assigned a new GUID. Because the GUID is different than the original GUID of the package registration object, the deployment software interprets this as a different application.

To solve these problems, including ensuring a seamless restore of a deployed application, the group policy management console attempts to preserve the GUID of the package registration object in the directory service. Unfortunately, if the group policy object is deleted, the package registration object is also deleted and its GUID lost. At the same time, the group policy management console has no control over the re-created package registration object's GUID, because it is a directory service object GUID, which is automatically generated by the directory service.

However, there is a way to recover a package registration object that does not exist in the directory, using a feature referred to as tombstone reanimation, which is available in a proper (e.g., Windows® Server 2003) operating environment. In general, tombstones provide a way to represent a directory object as deleted, without the object actually being deleted, which is useful in many replication scenarios. Tombstone reanimation enables these objects to be restored within some tombstone lifetime, (e.g., sixty days by default). Note that objects represented via a tombstone as deleted will be actually deleted when that tombstone lifetime value has been exceeded, and thus reanimation of an object cannot succeed if the tombstone lifetime has been exceeded. Further, reanimation requires that the user attempting reanimation had edit rights on the object when it was deleted, as well as permission to reanimate tombstone objects in the domain.

The group policy management console automatically attempts to reanimate a missing package registration object when performing a restore of a group policy object that involves software. In the event reanimation of a deleted package registration object succeeds, the same GUID is able to be reused, providing the seamless restore of the application deployment and upgrade information. If reanimation fails, a new package registration object (with a new GUID) is created in the directory service, which means the applications will be reinstalled if assigned, and installed as needed if published as optional, and any upgrade relationships will be lost. Note that if lost, and if there are upgrade relationships among applications within the group policy object, there is logic to remap the upgrade relationships, so that in the restored group policy object, the applications upgrade the applications in the restored group policy object, instead of pointing to the application in the original group policy object.

To help minimize the impact to end users, whenever a group policy management console instance detects that it is restoring a backup containing software settings in a environment that does not have tombstone reanimation, the user interface will guide the administrator to use a domain controller that operates in an operating environment that provides tombstone reanimation. To this end, a flag in the restore mechanism 540 validates whether the domain controller environment allows tombstone reanimation (if the GPO contains software deployment); by default, the user interface will request validation. Only if the user chooses to ignore the warning is validation bypassed.

In general, in typical practice, if a group policy object exists, then the package registration object also exists, however this is not guaranteed. For example, an administrator may un-deploy an application, but keep the group policy object. Generally the package registration object still exists because the package registrations are preserved for quite awhile (e.g., a year) after un-deploying an application. A discrepancy may arise if an application is un-deployed from a group policy object, a year (or other appropriate time) passes, and an administrator attempts to restore the group policy object to a version that is at least a year old. Note that in one environment, if a group policy object is deleted, the package registration object also is deleted, so it is not possible in such an environment to have the package registration object exist, but not the group policy object.

Note that software installation also has a script in the group policy object that matches data stored in msi files (installable modules) stored outside the group policy object. These msi files can be individually patched up when new fixes are made and script files need to be regenerated for the patched msi files. The group policy management console regenerates the script automatically when it detects that the script stored with the backup might not be synchronized with package being pointed to at the end of the operation.

Copy Operation

A copy operation, represented in FIG. 7, transfers settings from an existing, source group policy object in the Active Directory® in a domain as the source, to a new group policy object created as its destination. In general, the copy mechanism in the group policy management console may be used to create a group policy object with same settings as in the source group policy object, which is accomplished by initializing data from the group policy object, creating a new group policy object in the destination domain, and saving data (settings) into the group policy object.

The copy operation is used to transfer settings to a new group policy object that is in the same domain, cross-domain in the same forest, or cross-domain in a separate forest (also known as cross-forest). Because the copy can be cross-domain or cross forest, a migration table (described below) can be used to safely transform the group policy object during the process of copy (and import) for the appropriate domain. Note that because a copy operation uses an existing group policy object in the Active Directory® service as its source, trust is required between the source and destination domains. Copy operations are well-suited for replicating group policy data between production environments, as well as for migrating group policy data that has been staged and tested in a test domain or forest to a production environment, provided there is trust between the source and destination domains. If there is no trust between source and destination domains, a feature such as "Stored User Names and passwords" in Windows® may be used to gain access to both domains simultaneously.

When copying a group policy object, the administrator may specify the DACLs to use on the destination group policy object, by specifying that default permissions are to be used when creating the new group policy object, or specifying that the DACLs should be preserved from the source group policy object. Note that if a migration table (described below) is specified during the copy operation and the administrator chooses the option to preserve the DACL, the migration table will apply to any security principals in the DACL, so the DACL may be modified somewhat in this case.

There are some minor differences between same-domain and cross-domain copy operations. For example, when copying a group policy object within the same domain, any link to a WMI filter is preserved, however, when copying a group policy object to a new domain, the link is dropped, because WMI filters can only be linked to group policy objects within the same domain. Also, when copying a group policy object within the same domain, the administrator is presented with a straightforward choice of choosing the DACL. However, for cross-domain copy operations, group policy management console may provide assistance (e.g., present a wizard) to facilitate the operation. In the cross-domain case, the user interface provides the ability to specify a migration table (described below). Note that a migration table also may be used for operations in the same domain, although in some implementations the user interface does not present the administrator with such a choice.

Copying a group policy object is similar to an import operation from a backup, in that only settings are copied, however unlike an import the source group policy object is not a backup that was saved to a file system location. Note that included in the "settings" is group policy object status (e.g. the enabled/disabled combination of user configuration settings and computer configuration settings). In addition, a copy operation creates a new group policy object as part of the operation, whereas an import uses an existing group policy object as its destination. Imports are described below.

The copy operation requires rights to create group policy objects in the target domain into which the new group policy object is being copied. The copy mechanism may reuse the same user-friendly name because the copy mechanism generates a new GUID. The newly created group policy object will be initialized to a default version number, such as one (1).

Note that if the administrator selects to use default DACLs rather than those of the source, in one implementation, any customized DACLs set on the package registration object (inherited from the group policy object DACLs) will be lost upon the copy operation. Cross-group policy object upgrades will be lost in copy/import operations in cross-domain cases. This applies to both applications that upgrade others and applications that are upgraded by others. In addition, if there are upgrade relationships among applications within the group policy object, there is logic to remap the upgrade relationships so that in the copied group policy object, the applications upgrade the applications in the copied group policy object, instead of pointing to the application in the original group policy object. This behavior is the same for cross domain and same domain scenarios. Category information (e.g., identifying an application category) is not preserved in cross-domain cases, because categories are per-domain objects, and not part of the group policy object.

In general, the settings need to be properly transferred for the copy operation to succeed; if not, the copy operation is deemed a failure. The success or failure is logged to an event log, and any error condition (indicating what the copy mechanism failed to copy and why) is reported via a dialog or programmatically. Any partially copied group policy object is cleaned up to the extent possible. If the copy mechanism is unable to fully remove the partially copied group policy object, e.g., due to loss of network connectivity, then the copy mechanism communicates this to the administrator.

Note that there is a concept of partial success with respect to copy or import operations, similar to restore. Partial success occurs when the settings are fully transferred back into the group policy object, but certain aspects of the original group policy object can not be copied. For example, links to WMI filters and IPSec policies are dropped in cross domain copy and import cases. In addition, a partial success occurs when a security group on the group policy object or settings in the group policy object cannot be resolved. The operation (e.g., copy/import) occurs, but the security identifier (SID) shows up as an unresolved SID, and the administrator notified that the SID could not be resolved.

Import Operation

Importing a group policy object, represented in FIG. 6, allows the transfer of settings from a backed-up group policy object to an existing group policy object. The import operation can be performed within the same domain, across domains, or across forests. This facilitates scenarios such as staging of a test group policy object environment before importing into a production environment.

An import mechanism of the group policy management console imports a backup (source) from a file system (unlike a copy operation which uses a live group policy object in the Directory as its source) into an existing group policy object (destination), as specified by the administrator. The settings are extracted out of the persisted backup, and migration tables, described below, may be used to safely transform the group policy object for the destination domain during the import process. As can be readily appreciated, an import operation requires that the initiating administrator have write access to the target group policy object and read access to the backup location. To improve resiliency, the import operation uses the staging process that was previously described for restore operations.

Before importing, the import operation erases any existing settings in the targeted group policy object, and thereafter imports the settings from the backed-up group policy object. The import operation does not import group policy object DACLs, or links, including WMI filter links. These attributes are not erased, and remain unchanged on the target group policy object.

Administrators may want to consider importing settings into group policy objects only when running the group policy management console locally on the domain controller that the group policy management console has targeted for the operation. For example, the administrator might want to consider this capability when restoring or importing the default domain policy and default domain controller's policy since the contents of these group policy objects are more sensitive for the health of the domain. Performing an operation across a network can be prevented, such as if the user attempts to import settings (or restore) into a group policy object, and the machine on which the program is running on is not the domain controller that has been targeted by group policy management console for that domain. It is feasible to notify the administrator of these considerations, including by failing the operation when attempted across a network and notifying the administrator as to the reason that the operation failed.

Note that import operations are well-suited for migrating group policy data across environments where there is no trust between the domains and/or forests. For example, separate test and production forests with no trust between them can use import operations to migrate group policy objects that are developed and verified in the test forest to the production environment. Access to a source file system location, where the backed up group policy object is stored is needed from the destination environment. Depending on the settings in the group policy object, a migration table (described below may be used to effectively transfer the settings.

In copy and import operations, software installation data in a group policy object may include upgrade relationships with applications within the group policy object and/or applications external to the group policy objects. For internal group policy object upgrades, the relationships are adjusted to point to applications that have been copied within the group policy object, and software installation scripts are regenerated during the operation to keep the script synchronized with the msi locations. Like a copy operation, and if there are upgrade relationships among applications within the group policy object, there is logic to remap the upgrade relationships so that in the imported group policy object, the applications upgrade the applications in the imported group policy object, instead of pointing to the application in the original group policy object. This behavior is the same for cross domain and same domain scenarios.

In addition to upgrade relationships with applications in other group policy objects, applications deployed by software installation data in policy objects can also be categorized into different categories based on the kinds of applications. The global list of categories is maintained outside the group policy object. In copy and import operations in the same domain, the group policy management console handles these situations by preserving the settings if the linked objects still exist. In cross-domain cases, these settings are dropped and the administrator notified via detailed status messages.

Other cross-domain import and copy considerations involve wireless settings, which have data that is only configurable in more contemporary operating environments, e.g., in a Windows® Server 2003 domain. Such settings are dropped when such a group policy object is imported into an operating environment that cannot handle wireless settings, such as a Windows® 2000 domains.

Migration Tables

In addition to the complex way in which group policy object data is stored, certain policy data may be valid in one domain but be invalid in the domain to which a group policy object is being copied or is importing settings. For example, security identifiers (SIDs) stored in security policy settings for security principals are often domain-specific. In addition, Universal Naming Convention (UNC) paths for folder redirection, scripts, or software installation policies may not be accessible by users in the destination domain if the data in the group policy object is copied without modification to a different domain. Note that migration for every type of setting that references UNC paths or security principals may not be supported, e.g., due to their relatively rare occurrence.

Figure 9:
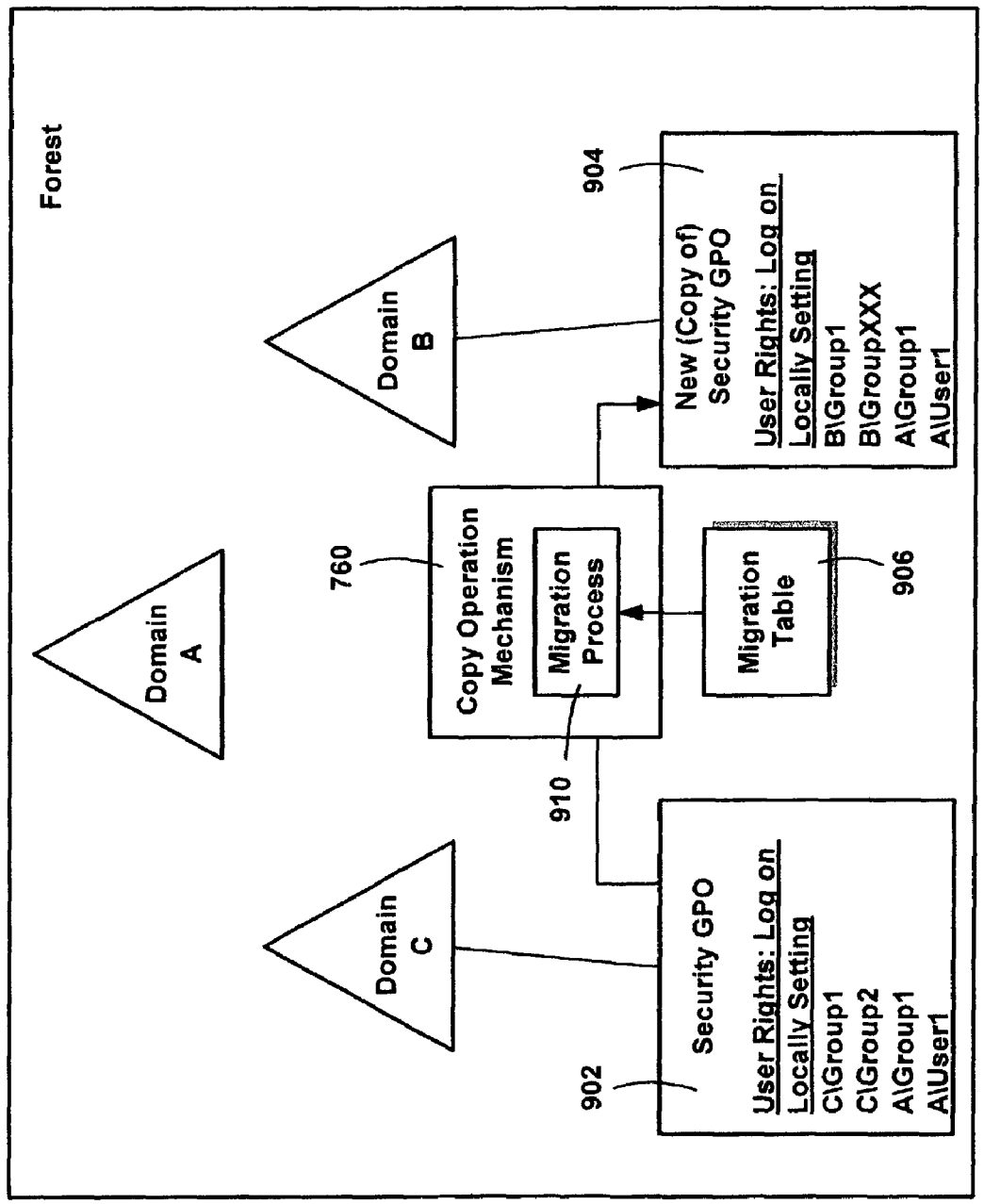
FIG. 9 is a block diagram generally representing use of a migration table to copy and transform security information from a group policy object to a new group policy object across domains in a forest, in accordance with an aspect of the present invention.
Figure 10:
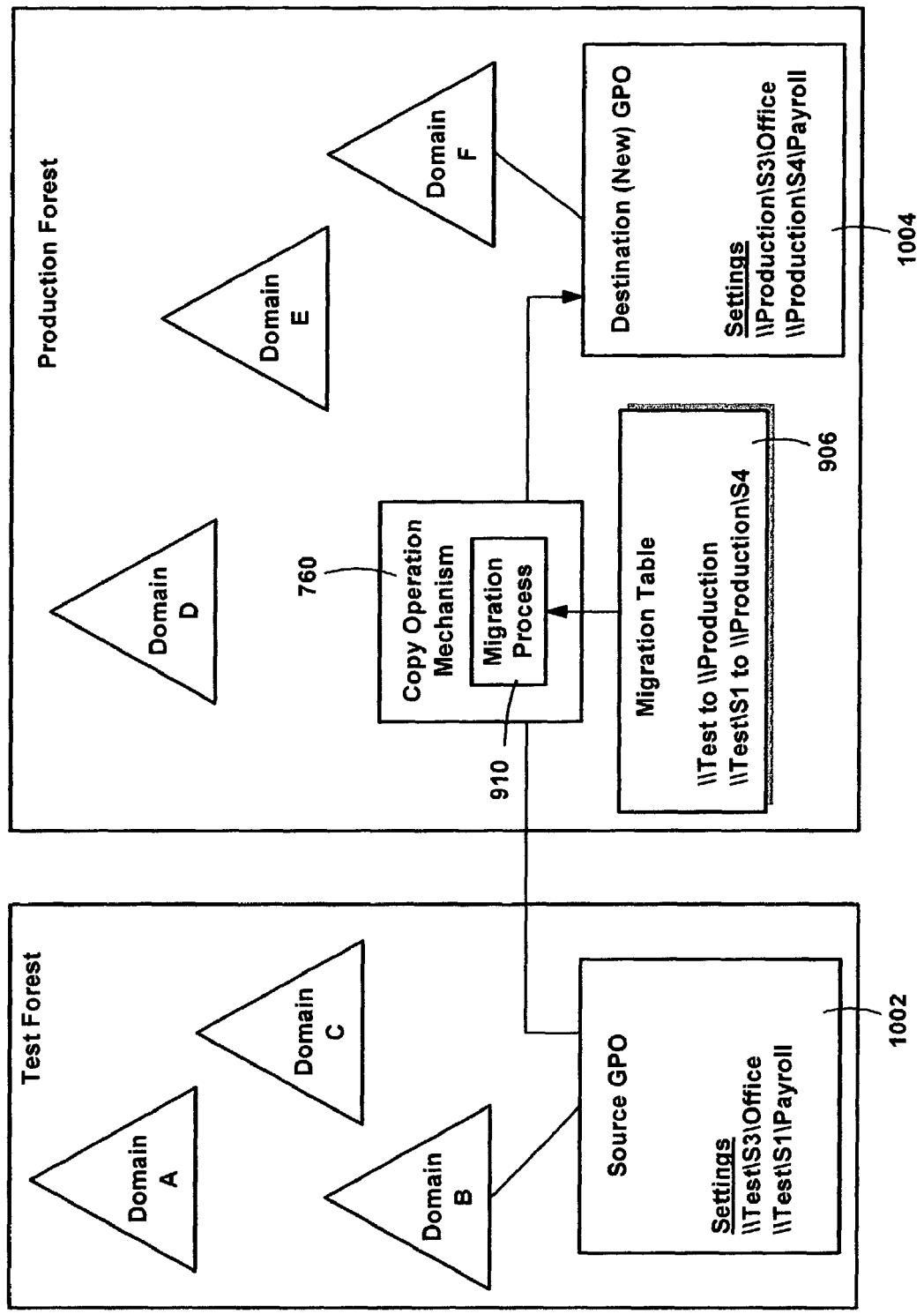
FIG. 10 is a block diagram generally representing use of a migration table to copy and transform UNC path information from a group policy object to a new group policy object across domains in different forests, in accordance with an aspect of the present invention.

For purposes of explanation, examples of likely migration scenarios will be described herein with reference to FIGS. 9 and 10, such as a production-to-production migration scenario using copy as an example (FIG. 9), or a test-to-production migration scenario using copy as an example (FIG. 10). Note that although the examples are described in the context of copy operations, it is understood that migration also applies to imports.

Production-to-production migration occurs when an administrator wants to migrate a group policy object from one production domain to another, such as within the same forest, as represented in FIG. 9. In this production-to-production example, a security group policy object 902, including a user rights settings part such as the right to log on locally, is being copied from Domain C to a counterpart newly created group policy object 904 in Domain B. In the process, some of the security principals referenced in the user rights settings should be mapped to new values that are more appropriate for the target domain. In this example, the migration process should change Domain C to Domain B, but leave references to security principals in Domain A unchanged.

In accordance with an aspect of the present invention, to facilitate appropriate mapping during migration, the group policy management console provides a migration table 906 to dynamically perform the changes during the copy or import operation. Note that the layout file (e.g., 784 of FIG. 7)

includes information that causes the migration table 906 to be used during the migration process 910 part of the copy or import operation that handles any security principal and/or UNC file/path name conversions.

Items can contain security principals and thus may require some extra work to successfully move them from one domain to another. Security policy settings include the following types: user rights assignment; restricted groups; system services; file system; registry; advanced folder redirection policy settings; the group policy object (DACL), (if chosen to preserve during a copy operation); and the DACL on software installation objects (only preserved if the option to copy the group policy object DACL is specified). Note that this is only a subset of security settings, e.g., those that correspond to security principals.

When a group policy object is backed up, the security principals and file paths specified in the group policy object are identified. In addition, the security principals are resolved to get their type (e.g., whether it is user, computer or domain local, global or universal security group), their friendly name in various formats (e.g., Sam-Compatible name, UPN name) and SID format. This type information is stored as part of the backup, in part so that this domain does not need to be accessed during the process of import or copy.

The migration table comprises a file that map references to users, groups, computers, and UNC paths in the source group policy object to new values in the destination group policy object. A migration table includes one or more mapping entries, with each mapping entry including a type, source reference, and destination reference. In one implementation, migration tables are implemented as XML files, and created with the group policy management console. The following XML represents the structure and options available in an example migration table:

```
<?xml version="1.0" encoding="utf-16"?>
  <MigrationTable xmlns:xsd="http://www.w3.org/2001/XMLSchema"
  xmlns:xsi="http://www.w3.org/2001/XMLSchema-instance"
  xmlns="http://www.microsoft.com/GroupPolicy/GPOOperations/
  MigrationTable">
    <Mapping>
      <Type>GlobalGroup</Type>
      <Source>TestDomain\Test Group</Source>
      <Destination>ProductionDomain\Marketing Users</Destination>
    </Mapping>
    <Mapping>
      <Type>UNCPath</Type>
      <Source>\\TestServer\Share</Source>
      <Destination>\\ProductionServer\Share2</Destination>
    </Mapping>
</MigrationTable>
```

As can be appreciated, the above example migration table includes a mapping for converting security principal data, of type global group, and another mapping for converting a UNC path, of type UNCPath. In actual practice, a migration table may have many more mappings. With migration tables an administrator can thus automatically change the values at the time of the import or copy operation. For example, the import or copy operation in the above XML file will automatically look for policy settings that specify the global group "Test Group," and change them to "Marketing Users," ensuring that the value in the target group policy object will be correct for the domain in which it exists. Similarly, any occurrence of policy settings with the UNC path "\\testserver\share" will be updated automatically to "\\productionserver\share2."

If a migration table is specified when performing an import or copy, each reference to the source entry is replaced with the destination entry when the settings are written into the destination group policy object. The migration table 906 will apply to any references in the settings within a group policy object, whether performing an import or copy operation. In addition, during a copy operation, if the option to preserve the discretionary access control list (DACL) on the group policy object is selected, the migration table will also apply to both the DACL on the group policy object and the DACLs on any software installation settings in the group policy object.

The migration table 906 thus specifies the source and source type and maps it to a given compatible destination. Conceptually, the migration table in the XML example above includes the information in the example table below for a test-to-production migration:

| Type | Source Value | Destination Value |
| --- | --- | --- |
| Global Group | TestDomain\Test Group | ProductionDomain\Marketing Users |
| UNC Path | \\testserver\share | \\productionserver\share2 |

To be used during the copy or import operation, the security principal's name and the type need to match the ones found in the source group policy object or backup.

As represented in FIG. 10, UNC paths (e.g., to file system locations in the domain) in a source group policy object 1002 can also be migrated to a destination group policy object 1004 (newly created in a copy operation), because servers in the original domain may not be accessible from the domain to which the group policy object is being migrated. For example, group policy objects that contain folder redirection policy settings, software installation policy settings and scripts (such as logon and startup) can each reference UNC paths and thus may need to be updated to new values as part of the migration process.

Note that such paths can be specified directly, or any of the parent paths can be used as the source of the mapping. If multiple matching file system entries are found, the most specific source entry will be used to specify the destination. Thus, as represented in FIG. 10, the more specific path information (e.g., \\Test\S1 to \\Production\S4 over \\Test to \\Production) in the migration table 906 is used for the "payroll" path.

In addition to direct mapping from one value to another, migration tables support several special destination options that can be used instead of explicitly specifying a new value. These destination options are implemented by adding a tag into an XML mapping. The destination options and their corresponding XML tags, are set forth in the table below:

| Destination Option | XML Tag |
| --- | --- |
| Same as source | <DestinationSameAsSource/> |
| None | <DestinationNone/> |
| Relative Name | <DestinationByRelativeName/> |

The "same as source" option copies the value exactly as is. This is equivalent to not specifying this source value in the migration table at all, in which case the values are copied directly, without modification. However, the "same as source" option allows an administrator to specifically include data in the migration table, rather than having to omit it to achieve the desired result. The "none" option will remove a specified security principal from the group policy object. This option can be used with security principals, but cannot be used with UNC paths.

The "relative name" option allows security principals to be mapped by the same relative name, wherein the relative name is the name of the principal without the domain part specified. For example, if a group is called TestDomain\Group1, then Group1 is the relative name. When this mapping option is specified, the group policy management console looks for a matching security principal in the destination domain that has the same relative name, and replaces any policy settings with the matching principal.

By way of example, consider the following entry in a migration table:

```
<Mapping>
    <Type>GlobalGroup</Type>
    <Source>TestDomain\GroupA </Source>
    <DestinationByRelativeName/>
</Mapping>
```

If copying a group policy object that has policy settings configured that contain the SID for TestDomain\GroupA, the administrator can simply create a security group in the destination domain called DestinationDomain\GroupA. Then when specifying a migration table with the above entry, the migration table mechanism will automatically change TestDomain\GroupA to DestinationDomain\GroupA as part of the operation. It should be noted that a migration table using this option may be used in any domain where a group with that relative name exists, e.g., one migration table can be used in many target domains if desired, providing significant flexibility.

To use the migration table, during the import or copy operation, a check is made to see whether the entry specified (name and type) in the backup is remapped in the migration table. If it is specified, the new entry from the migration table is used to configure the group policy object during the operation. Detailed status message entries are provided to provide details of the mapping provided and any warnings/errors as appropriate, as generally described above.

Not all group policy objects need to have their settings translated as part of the process of migrating from one domain to another. For example, administrative templates policy settings can be copied directly from one domain to another without needing to be modified. Thus, one option when copying a group policy object is to not use a migration table, in which case the group policy object is copied exactly as is, with references to security principals and UNC paths copied identically. A migration table can also be used to a limited extent, to map any references in the group policy object that are in the migration table, but copy "as is" any references that are not contained in the migration table. Note that copy operations (e.g., cross-domain) may or may not apply the migration table to the DACLs on the group policy object (and any software installation settings) depending on whether the option to preserve or migrate the existing permissions is chosen, or instead the default settings are to be used. As described above, the exclusive use option requires that all references to security principals and UNC paths that are referenced in the source group policy object be specified in the migration table. If a security principal or UNC path is referenced in the source group policy object and is not included in the migration table, the import or copy operation fails.

More particularly, when performing an import or copy operation, the administrator can choose to use the migration table exclusively. With this option set, the operation will fail if there are any security principals or UNC paths configured in the group policy object that are not also included in the specified migration table. This option is useful to ensure that every setting in the group policy object that may need to be updated as part of the migration is accounted for. Note that the "same as source" tag makes it possible for an administrator to use this option yet selectively not change a setting during migration.

In one implementation, in addition to the ability to specify a migration table, when performing a copy or import, the copy or import mechanism can scan the source group policy object to determine if there are any references to security principals or UNC paths in the group policy object. If there are, the administrator may be given an opportunity to specify a migration table at that time. Note that during cross-domain copy operations, if the option to preserve or migrate the permissions on the group policy object is chosen, the mechanism will always present the opportunity to specify a migration table, because a DACL by definition contains security principals.

The following table summarizes the three primary fields (type, source and destination) in each mapping of a migration table:

| Field | Description |
| --- | --- |
| Source Type | The type of domain-specific information in the domain for the source group policy object. Migration tables support the following types:<br>    User<br>    Computer<br>    Domain Local Group<br>    Domain Global Group<br>    Universal Group<br>    UNC Path<br>    Free Text or security identifier (SID). Note: This category is only for use with security principals that are specified as free text and raw SIDs.<br>    Note<br>        Built-in groups such as "Administrators" and "Account Operators" have the same SID in the domains. If references to built-in groups are stored in the group policy object using their resolved format (based on the underlying SID), they cannot be mapped using migration tables. However, if references to built-in groups are stored as free text, they can be mapped using a migration table, and in this case, a source type = "Free Text or SID" specified.<br>When viewed in an XML editor, the types are represented as follows:<br>    <Type>User</Type><br>    <Type>Computer</Type><br>    <Type>LocalGroup</Type><br>    <Type>GlobalGroup</Type><br>    <Type>UniversalGroup</Type><br>    <Type>UNCPath</Type><br>    <Type>Unknown</Type> |
| Source Name | The exact name of the User, Computer, Group or UNC Path referenced in the source group policy object. For example, TestDomain\PolicyAdmins or \\server1\publicshare. The type of the source name needs to match the source type specified in the migration table.<br>Security principals can be specified using any of the following formats:<br>    UPN. For example, "someone@example.com".<br>    SAM. For example, "example\someone".<br>    DNS. For example, "example.com\someone". |

-continued

| Field | Description |
|---|---|
| | Free text. For example, "someone" —specify the type as Unknown Group in this case.<br>SID. For example, S-1-11-111111111-111111111-1111111111-1112. Specify the type as Free Text or SID in this case. |
| Destination Name | The destination name specifies how the name of the User, Computer, Group or UNC Path in the source group policy object should be treated upon transfer to the destination group policy object.<br>There are four choices:<br>1. Same as source. Copy without changes. Equivalent to not putting the source value in the migration table at all.<br>　　MTE value: <Same As Source><br>　　XML tag: <DestinationSameAsSource /><br>2. None. Removes the User, Computer or Group from the group policy object. This option cannot be used with UNC paths.<br>　　MTE value: <None><br>　　XML tag: <DestinationNone /><br>3. Map by relative name. For example, map SourceDomain\Group1 to TargetDomain\Group1. This option cannot be used with UNC paths.<br>　　MTE value: <Map by Relative name><br>　　XML tag: <DestinationByRelativeName /><br>4. Explicitly specify value. In the group policy object for target domain, replace the source value with the exact literal value specified.<br>　　MTE value: <exact name to use in target><br>　　XML tag: <Destination>Exact name to use in target domain</Destination><br>Security principals can be specified using any of the following formats:<br>　　UPN. For example, "someone@example.com".<br>　　SAM. For example, "example\someone".<br>　　DNS. For example, "example.com\someone".<br>　　Free text. For example, "someone".<br>Raw SIDs cannot be used for the destination name. |

Conclusion

As can be seen from the foregoing detailed description, there is provided a method and system for performing backup, restore, import and copy operations on group policy objects. Copy and import operations may be performed within the same domain and across domains and forests. Backup management and many other issues are handled by the mechanisms performing these operations. The method and system thus provide significant advantages and benefits needed in contemporary computing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising:
receiving a request to perform an operation to restore data based upon a first group policy object, the first group policy object including: a globally unique identifier, settings of the first group policy object, discretionary access control lists and a first state including settings, the first group policy object being a backup on a file system;
attempting to perform the operation to restore data to change a second group policy object having a second state to a state that includes at least some of the settings of the first group policy object, the operation including replacing settings in the second group policy object with the settings of the first group policy object, the attempting to perform the operation to restore data including restoring data to the second group policy object based on the backup;
determining whether the data exists, and if not, whether the data can be reanimated; if the data is represented by a tombstone, then determining an age of the tombstone;
if the age of the tombstone has not exceeded its lifetime, then reanimating and restoring the data;
if the age of the tombstone has exceeded its lifetime, then recognizing that the data does not exist; and
determining whether the attempted operation was successful, and if not, returning the second group policy object to the second state.

2. The method of claim 1 wherein the backup corresponds to a group policy object that was deleted after the backup was written to the file system, and further comprising, creating the second group policy object before restoring data to the second group policy object based on the backup.

3. The method of claim 1 wherein the second group policy object comprises an existing instance of a group policy object from which the backup was written to the file system, and wherein restoring data to the second group policy object based on the backup comprises restoring at least some of the settings in the second group policy object based on the backup.

4. The method of claim 1 wherein the backup corresponds to a group policy object that was deleted after the backup was written to the file system, and further comprising, creating the second group policy object before restoring data to the second group policy object based on the backup.

5. The method of claim 1 wherein the second group policy object comprises an existing instance of a group policy object from which the backup was written to the file system, and wherein restoring data to the second group policy object based on the backup comprises restoring at least some of the settings in the second group policy object based on the backup.

6. The method of claim 1, further comprising backing up the first group policy object having the first state as a backup to persistent storage.

7. The method of claim 1 wherein the second group policy object comprises a later instance of the first group policy object.

8. The method of claim 1 further comprising, erasing the settings of the second group policy object before importing from the backup.

9. The method of claim 1 wherein the backup was made from a first group policy object of a first domain, and wherein the second group policy object exists in a second domain.

10. The method of claim 9 further comprising, changing at least some of the settings to adjust for differences between the first and second domains.

11. The method of claim 10 wherein the differences correspond to security-related data.

12. The method of claim 10 wherein the differences correspond to path-related data.

13. The method of claim 10 further comprising, accessing migration information to determine how to adjust for the differences.

14. The method of claim 1 further comprising, accessing migration information to change at least some of the settings in the second group policy object based on settings in the first group policy object.

15. The method of claim 1 wherein attempting to perform the operation comprises, copying data corresponding to the first group policy object to a staging area of the second group policy object, copying data from a main data location of the second group policy object to a data area for old data of the second group policy object, and copying data from the staging area to the main data location of the second group policy object.

16. The method of claim 15 wherein returning the second group policy object to the second state comprises, copying data from the data area for old data to the main data location of the second group policy object.

17. The method of claim 1 further comprising, disabling the group policy object, determining whether the attempted operation was successful, and if so, enabling the group policy object.

18. The method of claim 1 wherein receiving a request to perform an operation comprises providing a user interface.

19. The method of claim 1 wherein receiving a request to perform an operation comprises providing an interface for requesting the operation via a program.

20. The method of claim 19 wherein the program comprises script.

21. The method of claim 1 wherein attempting to perform the operation comprises reading a layout file.

22. The method of claim 1 further comprising, providing at least one status message related to the operation.

23. The method of claim 1, comprising:
in response to the received request, disabling the second group policy object into an error stage until the determining is complete.

24. In a computing environment, a method comprising:
receiving a request to migrate at least some data corresponding to a group policy object of a first domain to a group policy object of a second domain;
determining whether the data exists, and if not, whether the data can be reanimated;
if the data is represented by a tombstone, then determining an age of the tombstone;
if the age of the tombstone has not exceeded its lifetime, then reanimating the data;
if the age of the tombstone has exceeded its lifetime, then recognizing that the data does not exist;
migrating the data, if it exists, to the second domain, the migrating including:
accessing migration information to convert at least some data relative to the first domain to corresponding data relative to the second domain;
the accessing migration information to convert including converting at least some security-related data relative to the first domain to security-related data relative to the second domain.

25. The method of claim 24 wherein migrating the data comprises copying at least some data of one group policy object to another group policy object.

26. The method of claim 24 wherein migrating the data comprises importing at least some data from a backup structure corresponding to the group policy object of the first domain into the group policy object of the second domain.

27. The method of claim 24 wherein accessing the migration information to convert data comprises interpreting tags in an XML file.

28. The method of claim 24 further comprising, converting at least some path-related data relative to the first domain to path-related data relative to the second domain.

29. In a computing environment, a method comprising:
receiving a request to perform a copy operation based upon a first group policy object, the first group policy object having:
a globally unique identifier;
settings of the first group policy object;
discretionary access control lists; and
a first state, the first state comprising:
settings that apply to a group of users;
discretionary access control lists; and
a unique first identifier;
determining whether data associated with the copy operation exists, and if not, whether the data can be reanimated;
if the data is represented by a tombstone, then determining an age of the tombstone;
if the age of the tombstone has not exceeded its lifetime, then reanimating the data;
if the age of the tombstone has exceeded its lifetime, then recognizing that the data does not exist;
if the data exists, creating a second group policy object with a unique second identifier;
and copying the settings from the first group policy object to the second group policy object, without changing either the second unique identifier of the second group policy object or discretionary access control lists of the second group policy object, the copying of the settings including:
replacing settings in the second group policy object with the settings of the first group policy object; and
preserving a globally unique identifier of the second group policy object and discretionary access control lists of the second group policy object.

30. The method of claim 29 further comprising accessing migration information to convert at least some data of the first group policy object to a modified data setting in the second group policy object.

31. The method of claim 29 wherein first group policy object is in a different domain from the second group policy object.

32. The method of claim 31 further comprising, accessing migration information to convert at least some data relative to the first domain to corresponding data relative to the second domain.

33. The method of claim 29 wherein first group policy object is in a different forest from the second group policy object.

* * * * *